United States Patent
Kanehira

(10) Patent No.: US 9,313,405 B2
(45) Date of Patent: Apr. 12, 2016

(54) IMAGE PROCESSING DEVICE, IMAGE PROCESSING METHOD AND PROGRAM

(75) Inventor: Daisuke Kanehira, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/634,425

(22) PCT Filed: Mar. 10, 2011

(86) PCT No.: PCT/JP2011/001405
§ 371 (c)(1),
(2), (4) Date: Sep. 12, 2012

(87) PCT Pub. No.: WO2011/114667
PCT Pub. Date: Sep. 22, 2011

(65) Prior Publication Data
US 2013/0002541 A1  Jan. 3, 2013

(30) Foreign Application Priority Data

Mar. 19, 2010  (JP) ................................. 2010-063574

(51) Int. Cl.
*G09G 5/00* (2006.01)
*G06F 3/033* (2013.01)
(Continued)

(52) U.S. Cl.
CPC .......... *H04N 5/23293* (2013.01); *G06F 1/1694* (2013.01); *G06F 3/0483* (2013.01); *G06F 3/0485* (2013.01); *G09G 5/34* (2013.01); *G09G 2320/068* (2013.01); *G09G 2354/00* (2013.01)
USPC ............ 345/156; 345/158; 345/162; 345/169

(58) Field of Classification Search
CPC ..... G09G 5/00; G09G 5/34; G09G 2320/068; G09G 2354/00; G06F 3/0346; G06F 1/1694; G06F 3/0483; G06F 3/0485; H04N 5/23293

USPC .................................. 345/156, 158, 162, 169
See application file for complete search history.

(56) References Cited

U.S. PATENT DOCUMENTS 7,859,516 B2  12/2010  Hanyu
2002/0033848 A1*  3/2002  Sciammarella et al. ...... 345/838
(Continued)

FOREIGN PATENT DOCUMENTS

| CN | 101082837 A | 12/2007 |
| CN | 101589354 A | 11/2009 |

(Continued)

OTHER PUBLICATIONS

Supplementary European Search Report from EP Application No. 11755860, dated Aug. 1, 2013.
(Continued)

*Primary Examiner* — Aneeta Yodichkas
(74) *Attorney, Agent, or Firm* — Lerner, David, Littenberg, Krumholz & Mentlik, LLP

(57) ABSTRACT

Embodiments of the technology involve apparatus and methods for control of displaying of images. In an example, an apparatus may include an image display, a sensor to detect posture of the image display and a processor to control sequentially displaying images of a group of images on the image display based on changes in the detected posture. The processor may control a display of a posture indicator on the image display such that the indicator may represent a relation between a change in the detected posture and an image of the group of images. Optionally, the indicator may be represented by a tilt meter. Moreover, in some embodiments, the sensor may be implemented with a gyroscopic sensor.

32 Claims, 29 Drawing Sheets

(51) Int. Cl.
*G09G 5/08* (2006.01)
*G06F 3/02* (2006.01)
*H04N 5/232* (2006.01)
*G09G 5/34* (2006.01)
*G06F 1/16* (2006.01)
*G06F 3/0483* (2013.01)
*G06F 3/0485* (2013.01)

(56) References Cited

U.S. PATENT DOCUMENTS

| | | | |
|---|---|---|---|
| 2006/0132675 A1* | 6/2006 | Choi | 349/76 |
| 2006/0281453 A1* | 12/2006 | Jaiswal et al. | 455/423 |
| 2007/0290999 A1* | 12/2007 | Cho et al. | 345/158 |
| 2008/0042973 A1* | 2/2008 | Zhao et al. | 345/156 |
| 2008/0292212 A1 | 11/2008 | Ozaki | |
| 2009/0086047 A1 | 4/2009 | Suehiro | |
| 2009/0262074 A1* | 10/2009 | Nasiri et al. | 345/158 |
| 2010/0066666 A1* | 3/2010 | Kim et al. | 345/156 |
| 2011/0126156 A1* | 5/2011 | Krishnaraj et al. | 715/828 |
| 2011/0157231 A1* | 6/2011 | Ye et al. | 345/649 |

FOREIGN PATENT DOCUMENTS

| | | |
|---|---|---|
| JP | 06-004208 A | 1/1994 |
| JP | 11-305918 | 11/1999 |
| JP | 2005-221816 A | 8/2005 |
| JP | 2006-065368 A | 3/2006 |
| JP | 2009-110178 A | 5/2009 |
| JP | 2010009575 A | 1/2010 |
| WO | 2009145335 A1 | 12/2009 |

OTHER PUBLICATIONS

Office Action from Japanese Application No. 2010-063574, dated Mar. 25, 2014.
Office Action from Chinese Application No. 2011-80014132.4, dated Jul. 3, 2014.
Chinese Office Action for CN Application No. 201180014132.4, dated Jan. 21, 2015.

* cited by examiner

Fig. 4

210 IMAGE MANAGEMENT INFORMATION STORAGE UNIT

| 211 GROUP IDENTIFICATION INFORMATION | 212 IMAGE CONTENT IDENTIFICATION INFORMATION | 213 ANGLE INFORMATION | 214 REPRESENTATIVE IMAGE | 215 MANIPULATION METHOD | 216 GROUP TYPE |
|---|---|---|---|---|---|
| #101 | #1 | ABSENCE | ABSENCE | ABSENCE | ABSENCE |
| #102 | #2 | ABSENCE | #3 | VERTICAL ROTATION | MULTI-VIEW IMAGE |
|  | #3 | ABSENCE |  |  |  |
|  | #4 | ABSENCE |  |  |  |
| #103 | #5 | ABSENCE | ABSENCE | ABSENCE | ABSENCE |
| #104 | #6 | ABSENCE | ABSENCE | ABSENCE | ABSENCE |
| #105 | #7 | -60° | #9 | HORIZONTAL ROTATION | MULTI-VIEW IMAGE |
|  | #8 | -45° |  |  |  |
|  | #9 | 0° |  |  |  |
|  | #10 | +20° |  |  |  |
|  | #11 | +35° |  |  |  |
|  | #12 | +60° |  |  |  |
| #106 | #13 | ABSENCE | ABSENCE | ABSENCE | ABSENCE |
| #107 | #14 | ABSENCE | #15 | HORIZONTAL MOVEMENT | MULTI-SHOT IMAGE |
|  | #15 | ABSENCE |  |  |  |
|  | #16 | ABSENCE |  |  |  |
|  | #17 | ABSENCE |  |  |  |
| #108 | #18 | ABSENCE | #18 | VERTICAL MOVEMENT | MULTI-SHOT IMAGE |
|  | #19 | ABSENCE |  |  |  |
| ⋮ | ⋮ | ⋮ | ⋮ | ⋮ | ⋮ |

Fig. 7

DISPLAY TRANSITION EXAMPLE UPON SETTING OF REPRESENTATIVE IMAGE DISPLAY MODE

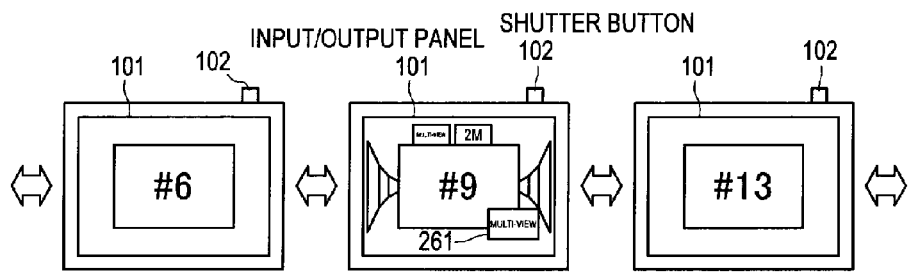

(a) GROUP IMAGE DISPLAY MODE SETTING MANIPULATION UPON DISPLAY OF IMAGE #9

DISPLAY EXAMPLE DURING RENDERING PROCESS

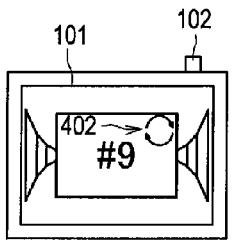

TOUCH MANIPULATION ON DISPLAY SURFACE (REPRESENTATIVE IMAGE DISPLAY MODE SETTING MANIPULATION)

(b) TERMINATION OF RENDERING PROCESS OF IMAGE TO BE DISPLAYED UPON SETTING OF GROUP IMAGE DISPLAY MODE

DISPLAY TRANSITION EXAMPLE UPON SETTING OF GROUP IMAGE DISPLAY MODE

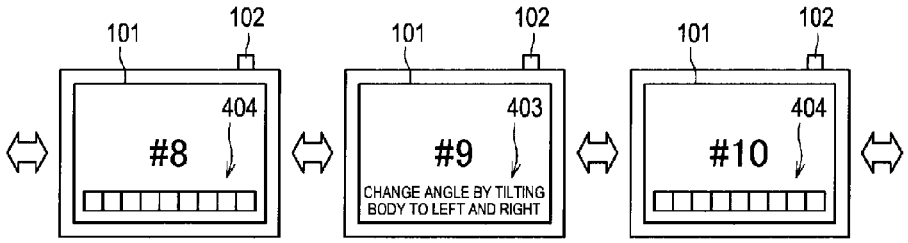

(c)

(a) (b)

Fig. 16
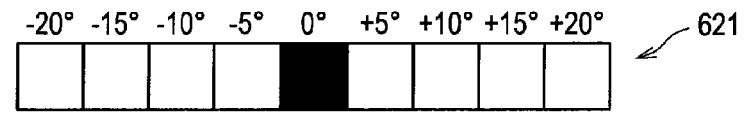
⇩ ROTATE 5° TO RIGHT
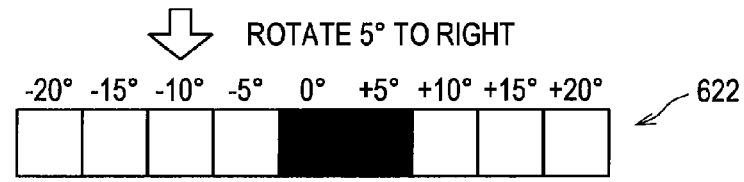
⇩ ROTATE 10° TO RIGHT
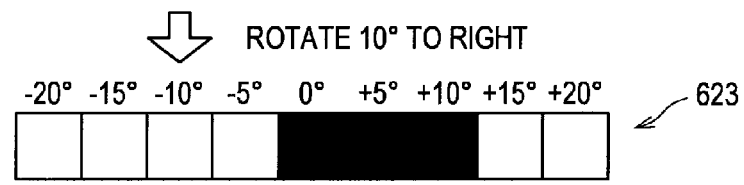
⇩ ROTATE 15° TO RIGHT
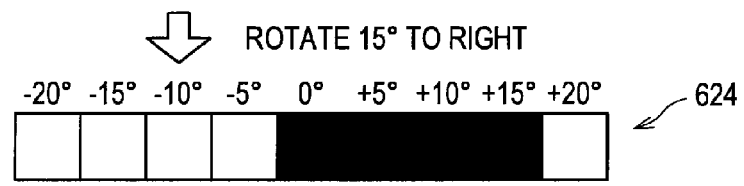
⇩ ROTATE 20° TO RIGHT
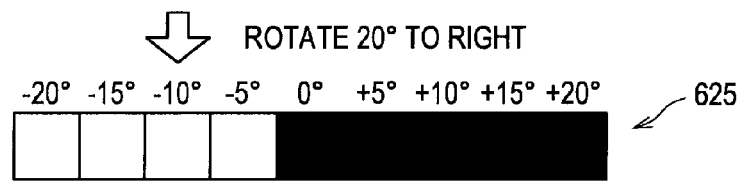
(a)
WHEN ANGLE IS MAINTAINED
⇩ SEQUENTIALLY ADVANCE IMAGE TO MAINTAIN METER DISPLAY
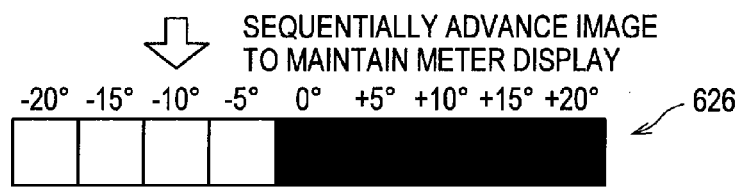
(b)
WHEN ANGLE IS RETURNED
⇩ ADVANCE IMAGE TO SWITCH METER DISPLAY
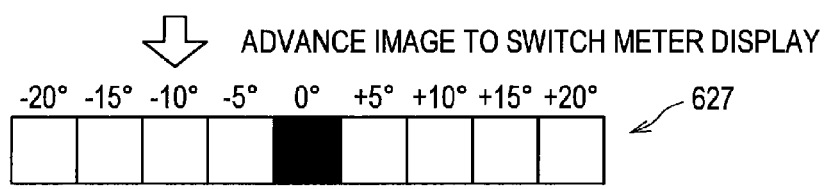
(c)

Fig. 17A
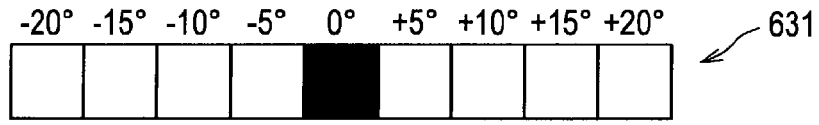
⇩ ROTATE 5°/S TO RIGHT
(DO NOT ADVANCE IMAGE)
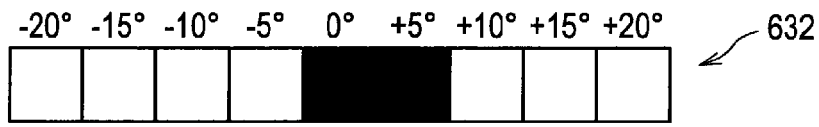
Fig. 17B
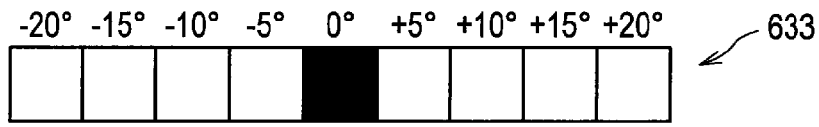
⇩ ROTATE 10°/S TO RIGHT
(DO NOT ADVANCE IMAGE)
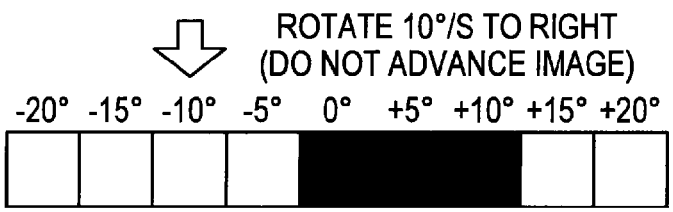
Fig. 17C
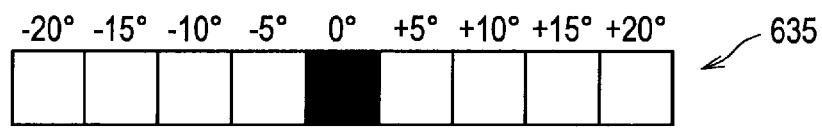
⇩ ROTATE 20°/S TO RIGHT
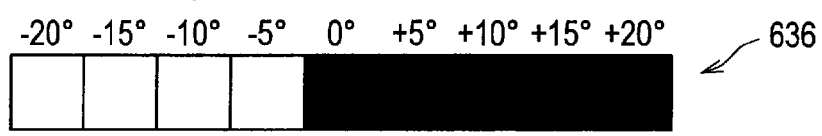
⇩ ADVANCE IMAGE TO SWITCH METER DISPLAY
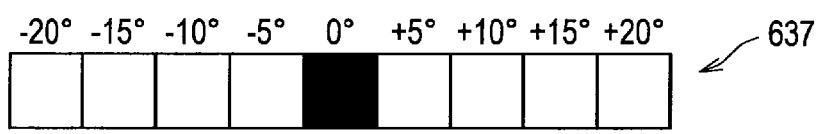

IMAGE PROCESSING DEVICE, IMAGE PROCESSING METHOD AND PROGRAM

CROSS-REFERENCE TO RELATED APPLICATION

The present application is a national phase entry under 35 U.S.C. §371 of International Application No. PCT/JP2011/001405 filed Mar. 10, 2011, published on Sep. 22, 2011 as WO 2011/114667 A1, which claims priority from Japanese Patent Application No. JP 2010-063574 filed in the Japanese Patent Office on Mar. 19, 2010.

TECHNICAL FIELD

The present invention relates to an image processing device, and more particularly, to an image processing device and an image processing method for displaying an image, and a program for causing a computer to execute the method.

BACKGROUND ART

In recent years, imaging devices such as a digital still camera or a digital video camera (e.g., a camera-integrated recorder) for imaging a subject such as a person or an animal to generate image data and recording the image data as image content have been used.

For example, there is a reproduction apparatus for performing image advancing by user manipulation using a manipulation member and sequentially displaying a plurality of images. Also, there is a reproduction apparatus in which a user changes a posture of the reproduction apparatus to change displayed content of a display unit.

For example, an information processing device for obtaining a movement amount or a rotation amount of a body and instructing, for example, to scroll displayed content of a display unit according to the amount has been proposed (e.g., see Patent Literature 1).

CITATION LIST

Patent Literature

PTL 1

Japanese Patent Application Laid-Open No. H06-4208 (FIG. 3)

SUMMARY OF INVENTION

Some embodiments of the present technology may involve a method of a processor to control a display of images. The method may involve detecting posture of an image display device with a sensor. The method may also involve sequentially displaying images of a group of images on the image display device based on changes in the detected posture. The method may also involve displaying a posture indicator on the image display device, the indicator representing a relation between a change in the detected posture and an image of the group of images.

Optionally, the indicator may include a graphic tilt meter. In some embodiments, the processor may associate a normalized tilt angle with an image of the sequentially displayed images. The normalized tilt angle may comprise an angle determined as a function of image capture angle information and a maximum tilt angle. In some embodiments, the image capture angle information may comprise a range of captured image angles. Still further, the maximum tilt angle may comprise a display viewing angle limit. In some cases, the method may also involve sequentially displaying entrance images for groups of images on the image display device based on changes in the detected posture. Optionally, the sensor may comprise a gyroscopic sensor.

Some embodiments of the present technology may involve an apparatus for control of displaying of images. The apparatus may include an image display, a sensor to detect posture of the image display and a processor to control sequentially displaying images of a group of images on the image display based on changes in the detected posture. The processor may control a display of a posture indicator on the image display such that the indicator may represent a relation between a change in the detected posture and an image of the group of images.

Optionally, the indicator may comprise a tilt meter. Still further, the processor may control associating a normalized tilt angle with an image of the sequentially displayed images. The detection of posture may comprise a detection of angular velocity. Moreover, the processor may control changing the display based on the angular velocity. In some cases of the apparatus, the processor may control calculating the normalized tilt angle as a function of image capture angle information and a maximum tilt angle. The image capture angle information may comprise a range of captured image angles. The maximum tilt angle may comprise a display viewing angle limit. In some such embodiments, the processor may control sequentially displaying entrance images for groups of images on the image display device based on changes in the detected posture. The sensor may include a gyroscopic sensor.

In still further embodiments of the technology may involve a system for control of displaying images. The system may include a display means for image displaying. The system may also include a posture means for sensing posture of the means for image displaying. The system may also include a control means for controlling sequentially displaying images of a group of images on the display means based on changes in the sensed posture. In some cases, the control means may control a display of a means for posture indicating on the image display, the means for posture indicating representing a relation between a change in the sensed posture and an image of the group of images. Still further, the control means may control associating of a normalized tilt angle with an image of the sequentially displayed images. Moreover, the control means may control calculating the normalized tilt angle as a function of image capture angle information and a maximum tilt angle. In some cases, such an image capture angle information may comprise a range of captured image angles determined by the posture means.

Technical Problem

According to the above-described related art, the displayed content of the display unit can be changed by changing the posture of a device, making it possible for a user to perform a changing manipulation in a state in which the user holds the device by hand.

Here, a case in which image advancing or image returning is performed on a plurality of images by changing posture of a device is assumed. In this case, a user performs a manipulation to change posture of the device while viewing images sequentially displayed on the display unit. Accordingly, it is understood that the user can easily perform the manipulation if he or she can easily recognize an image advancing or image returning timing or a position relationship of display images in an image group while viewing images sequentially displayed on the display unit.

In light of the foregoing, it is desirable to easily perform a manipulation to sequentially display a plurality of images using a manipulation method of changing posture of a device.

BRIEF DESCRIPTION OF DRAWINGS

FIG. 4 schematically shows stored content of the image management information storage unit 210 in the first embodiment of the present invention.

FIG. 7 schematically shows an image display transition example in the input/output panel 101 in the first embodiment of the present invention.

FIG. 16 shows a display transition example of manipulation support information (tilt meter) displayed by the group image reproduction unit 160 in the first embodiment of the present invention.

FIG. 17A shows a display transition example of manipulation support information (tilt meter) displayed by the group image reproduction unit 160 in the first embodiment of the present invention.

FIG. 17B shows a display transition example of manipulation support information (tilt meter) displayed by the group image reproduction unit 160 in the first embodiment of the present invention.

FIG. 17C shows a display transition example of manipulation support information (tilt meter) displayed by the group image reproduction unit 160 in the first embodiment of the present invention.

DESCRIPTION OF EMBODIMENTS

Figure 1A:
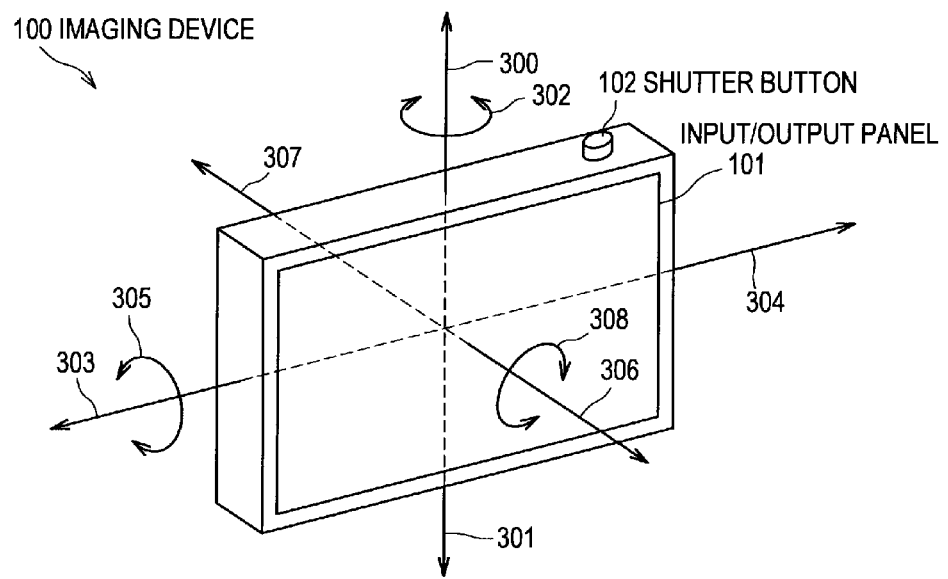
FIG. 1A shows an appearance configuration example of an imaging device 100 in a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. First embodiment (display control: an example in which an indicator or a tilt meter superimposed on an image in a group is displayed in a group image display mode)
2. Variant

1. First Embodiment

Appearance Configuration Example of Imaging Device

Figure 1B:
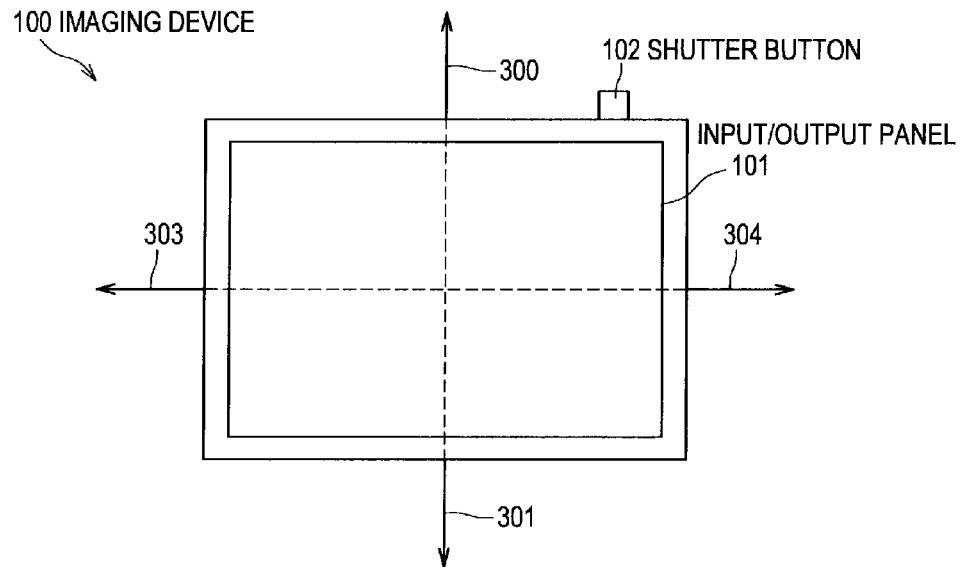
FIG. 1B shows an appearance configuration example of an imaging device 100 in a first embodiment of the present invention.

FIGS. 1A and 1B show an appearance configuration example of an imaging device 100 in a first embodiment of the present invention. FIG. 1A is a perspective view showing an appearance at a display surface side of the imaging device 100. FIG. 1B is a side view showing an appearance at the display surface side of the imaging device 100. The imaging device 100 is realized, for example, by a digital still camera or a digital video camera (e.g., camera-integrated recorder) capable of imaging a subject to generate image data, recording the image data as image content, and displaying the image content.

The imaging device 100 includes an input/output panel 101 and a shutter button 102. The imaging device 100 is an image processing device that can be carried by a user and the user can view an image displayed on the input/output panel 101. The imaging device 100 is one example of an image processing device defined in the claims.

The input/output panel 101 displays various images and receives a manipulation input from a user by detecting a contact manipulation on the input/output panel 101. The shutter button 102 is a button pressed by a photographer when image data (an imaged image) generated by imaging a subject is recorded as image content (a still image file).

The imaging device 100 includes other manipulation members such as a power switch and a mode switching switch, a lens unit, and the like, but such manipulation members will not be shown and described herein for ease of explanation.

Here, the lens unit (not shown) is an optical system including a plurality of lenses for focusing light from the subject, an aperture, and the like.

Here, a change of posture of the imaging device 100 will be described. For example, the user may change rotation angles (i.e., a yaw angle, a pitch angle, and a roll angle) about three orthogonal axes in a state in which the user holds the imaging device 100 by hand. For example, the user may change the posture of the imaging device 100 in a direction indicated by the arrow 302 (the yaw angle), the axis of which is the arrow 300 (or the arrow 301). The change example is shown in FIG. 2B. For another example, the user may change the posture of the imaging device 100 in a direction indicated by the arrow 305 (the pitch angle), the axis of which is the arrow 303 (or the arrow 304). For yet another example, the user may change the posture of the imaging device 100 in a direction indicated by the arrow 308 (the roll angle), the axis of which is the arrow 306 (or the arrow 307).

Further, for example, the user may change the posture of the imaging device 100 by moving (sliding) the imaging device 100 along a straight line on a plane in a state in which the user holds the imaging device 100 by hand. For example, the user may change the posture by moving the imaging device 100 in the direction indicated by the arrow 300 or the arrow 301 (movement in a vertical direction in FIG. 1B). For another example, the user may change the posture by moving the imaging device 100 in a direction indicated by the arrow 303 or 304 (movement in a horizontal direction in FIG. 1B). This change example is shown in FIG. 2C. Further, for example, the user may change the posture by moving the imaging device 100 in a direction indicated by the arrow 306 or 307.

Use Example of Imaging Device

Figure 2A:
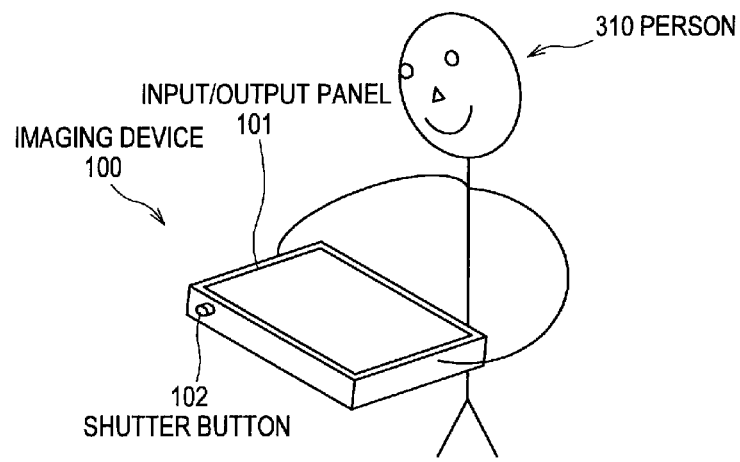
FIG. 2A shows one example of posture when the imaging device 100 is used in the first embodiment of the present invention.
Figure 2B:
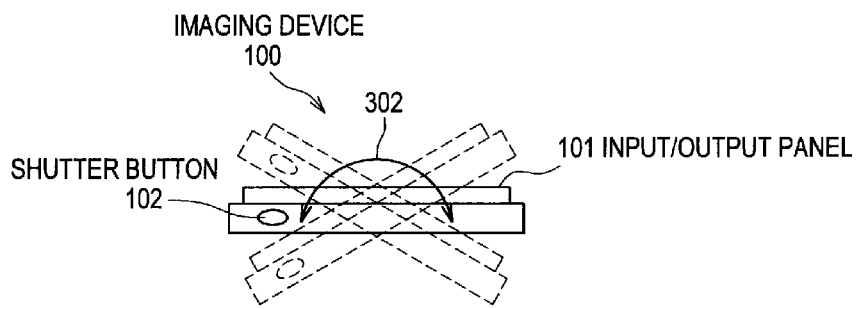
FIG. 2B shows one example of posture when the imaging device 100 is used in the first embodiment of the present invention.
Figure 2C:
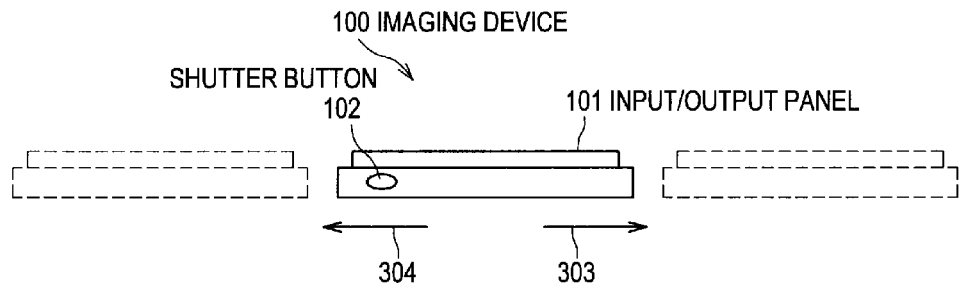
FIG. 2C shows one example of posture when the imaging device 100 is used in the first embodiment of the present invention.

FIGS. 2A to 2C show one example of the posture when the imaging device 100 is used in the first embodiment of the present invention. In FIG. 2A, one example of the posture of the imaging device 100 when image content reproduction is performed using the imaging device 100 is shown. When a person 310 performs the image content reproduction using the imaging device 100, the person 310 may view an image displayed on the input/output panel 101, for example, in a state in which the person 310 holds the imaging device 100 with both hands as shown in FIG. 2A.

In FIGS. 2B and 2C, a transition example in which the posture of the imaging device 100 is changed is shown. In FIG. 2B, a transition example when the imaging device 100 is rotated in the direction indicated by the arrow 302 about the arrow 300 (301) shown in FIG. 1A to change the posture is shown.

In FIG. 2C, a transition example in which the imaging device 100 is moved in the direction indicated by the arrows 303 and 304 shown in FIGS. 1A and 1B to change the posture is shown. In the first embodiment of the present invention, an example in which an image displayed on the input/output panel 101 is sequentially changed by changing the posture of the imaging device 100 as such is shown. That is, an example in which the image displayed on the input/output panel 101 is sequentially changed by gesture manipulation by the user is shown. Such changes of the image display status will be described in detail with reference to FIGS. 6, 7, or the like.

Functional Configuration Example of Imaging Device

Figure 3:
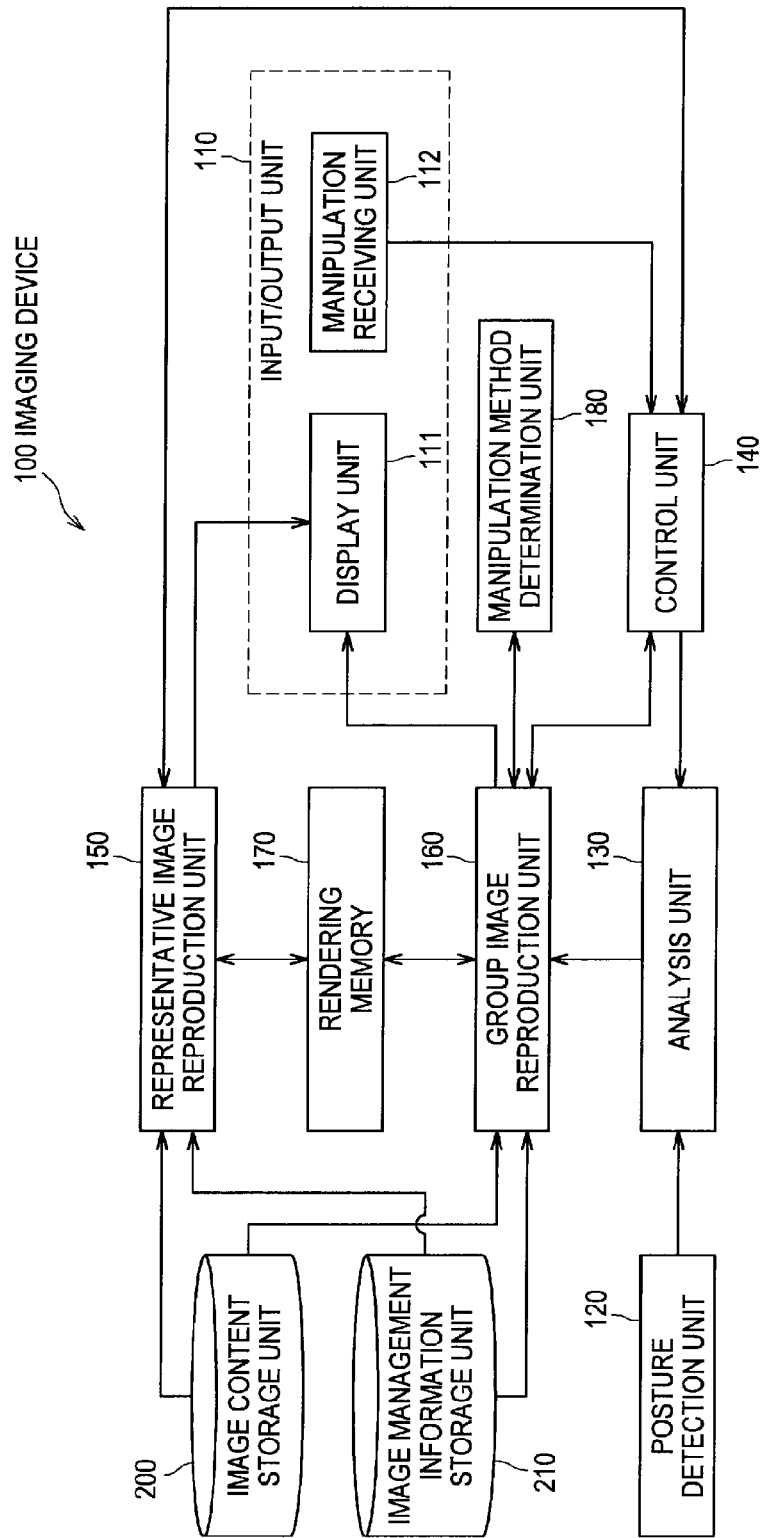
FIG. 3 is a block diagram showing a functional configuration example of the imaging device 100 in the first embodiment of the present invention.

FIG. 3 is a block diagram showing a functional configuration example of the imaging device 100 in the first embodiment of the present invention. The imaging device 100 includes an input/output unit 110, a posture detection unit 120, an analysis unit 130, a control unit 140, a representative image reproduction unit 150, a group image reproduction unit 160, a rendering memory 170, and the manipulation method determination unit 180. Moreover, the imaging device 100 includes an image content storage unit 200, and an image management information storage unit 210.

The image content storage unit 200 stores image data (an imaged image) generated by the imaging unit (not shown) as an image file (image content (still image content or moving image content)). The image content storage unit 200 supplies the stored image content to the representative image reproduction unit 150 or the group image reproduction unit 160. In the first embodiment of the present invention, an example in which the still image content is used as the image content is shown.

The image management information storage unit 210 stores management information (image management information) on the image content stored in the image content storage unit 200. Using the image management information, reproduction in the representative image display mode and the group image display mode is performed. Here, the representative image display mode is a mode in which a representative image of grouped image contents and an image of non-grouped image content among the image contents stored in the image content storage unit 200 are sequentially displayed according to user manipulation. The group image display mode is a mode in which images of each grouped image content among the image contents stored in the image content storage unit 200 are sequentially displayed according to the change of the posture of the imaging device 100. The image content storage unit 200 and the image management information storage unit 210 may be, for example, one or a plurality of removable recording media, such as discs, such as digital versatile discs (DVDs) or semiconductor memories such as memory cards. The recording media may be embedded in the imaging device 100 or detachably provided in the imaging device 100.

The input/output unit 110 includes a display unit 111 and a manipulation receiving unit 112. The display unit 111 is a display unit for displaying an image supplied from the representative image reproduction unit 150 or the group image reproduction unit 160. Various menu screens or various images are displayed on the display unit 111. The display unit 111 may be, for example, a liquid crystal display (LCD) or an organic electro luminescence (EL) panel.

The manipulation receiving unit 112 is a manipulation receiving unit for receiving content of a manipulation by the user, and supplies a manipulation signal dependent on the received manipulation content to the control unit 140. The manipulation receiving unit 112 corresponds to, for example, the manipulation member such as the shutter button 102 shown in FIGS. 1A and 1B or a touch panel. For example, the touch panel is superimposed on the display unit 111 to transmit the screen of the display unit 111, and receives a manipulation input from the user by detecting an object contacting the display surface. That is, when a user presses a desired location, for example, by touching the display surface in the input/output unit 110 with his or her finger, the touch panel detects a coordinate of the pressed location and outputs a manipulation signal corresponding to the detected coordinate to the control unit 140. When the control unit 140 acquires the manipulation signal, the control unit 140 executes a predetermined process based on the acquired manipulation signal. The manipulation receiving unit 112 may be, for example, a touch panel for converting a contact on a display surface into an electrical signal using a dedicated sensing device and outputting the converted electrical signal to the control unit 140. Further, the manipulation receiving unit 112 may be, for example, a touch panel of an optical sensor type capable of detecting an object (e.g., a user's finger) approaching or contacting a display surface. The input/output unit 110 corresponds to a manipulation member such as the shutter button 102 or the input/output panel 101 shown in FIGS. 1A and 1B.

The posture detection unit 120 detects a change of the posture of the imaging device 100 by detecting acceleration, movement, tilt and the like of the imaging device 100, and outputs posture change information about the detected change of the posture to the analysis unit 130. For example, the posture detection unit 120 detects a movement direction and a movement amount in a specific direction of the imaging device 100, and an angular velocity in the specific direction (an angular velocity when the posture of the imaging device 100 is changed) as the change of the posture of the imaging device 100. The posture detection unit 120 may be realized by a gyro sensor (angular velocity sensor) or an acceleration sensor. The posture detection unit 120 is an example of a detection unit defined in the claims.

The analysis unit 130 analyzes the change amount (e.g., the movement direction and the movement amount) of the posture of the imaging device 100 based on the posture change information output from the posture detection unit 120 to generate analysis information for performing display switching on the image or the manipulation support information displayed on the display unit 111. The analysis unit 130 outputs the analysis information to the group image reproduction unit 160.

The control unit 140 controls each unit of the imaging device 100 based on the manipulation content from the manipulation receiving unit 112. For example, the control unit 140 sets the representative image display mode when the manipulation receiving unit 112 receives a representative image display mode setting manipulation and sets the group image display mode when the manipulation receiving unit 112 receives a group image display mode setting manipulation.

Further, when the group image display mode setting manipulation is received, the control unit 140 performs a control to sequentially display, on the display unit 111, the images in the group corresponding to the representative image displayed on the display unit 111 upon the setting manipulation. When the group image display mode is set, the control unit 140 performs a control to display, on the display unit 111, the manipulation support information indicating a relationship between the change of the posture of the imaging device 100 and the display state in the display unit 111. The manipulation support information is information for supporting a manipulation to change the display state in the display unit 111 and is, for example, an indicator 660 shown in FIG. 18(a) or a tilt meter 670 shown in FIG. 19(a). Further, the control unit 140 performs a control to display, on the display unit 111, the manipulation support information based on the position of the posture of the imaging device 100 associated by the manipulation method determination unit 180 and the plurality of image contents.

When the representative image display mode has been set and an instruction manipulation to instruct display switching (e.g., image advancing and image returning) of the image displayed on the display unit 111 is received, the control unit 140 instructs the representative image reproduction unit 150 to switch the image display based on the instruction manipulation. Further, when a group image display mode setting manipulation is performed, the control unit 140 acquires the image management information (the manipulation method 215, or the like, shown in FIG. 4) associated with the group corresponding to the representative image displayed on the display unit 111 upon a setting manipulation from the group image reproduction unit 160. The control unit 140 is realized by, for example, a central processing unit (CPU).

The representative image reproduction unit 150 displays, on the display unit 111, image content corresponding to the representative image and non-grouped image content among the image contents stored in the image content storage unit 200 under control of the control unit 140. Specifically, when the representative image display mode has been set, the representative image reproduction unit 150 acquires the image content corresponding to the representative image and non-grouped image content from the image content storage unit 200. Subsequently, the representative image reproduction unit 150 decodes the acquired image content and renders a display image in the rendering memory 170 based on the decoded image content. The representative image reproduction unit 150 sequentially displays one of the images rendered in the rendering memory 170 on the display unit 111 under control of the control unit 140. The representative image reproduction unit 150 displays, on the display unit 111, the representative image, and manipulation support information (e.g., the manipulation support information 261 shown in FIG. 5) supporting the setting manipulation to the group image display mode for displaying each image in the group corresponding to the representative image. Further, the representative image reproduction unit 150 displays, on the display unit 111, the representative image, and manipulation support information (e.g., the manipulation support information 251, 252, 256, and 257 shown in FIG. 5) indicating the representative image, and a type of the group corresponding to the representative image (e.g., the group type 216 shown in FIG. 4).

The group image reproduction unit 160 displays the grouped image contents among the image contents stored in the image content storage unit 200 on the display unit 111 in a group unit under control of the control unit 140. Specifically, when the group image display mode is set, the group image reproduction unit 160 acquires each image content belonging to the group corresponding to the representative image displayed upon the group image display mode setting manipulation from the image content storage unit 200. Further, the group image reproduction unit 160 acquires the image management information associated with each image content belonging to the group from the image management information storage unit 210. Subsequently, the group image reproduction unit 160 outputs the acquired image management information to the manipulation method determination unit 180. Moreover, for example, the group image reproduction unit 160 decodes the acquired image content and renders a display image in the rendering memory 170 based on the decoded image content. In this case, the group image reproduction unit 160 arranges display images and renders the images in the rendering memory 170, for example, according to a predetermined rule.

When the group image display mode setting manipulation is received, the group image reproduction unit 160 displays each image belonging to a group to be displayed and manipulation support information on the display unit 111 to be associated with each other. In this case, for example, the group image reproduction unit 160 changes content of the manipulation support information based on the change of the posture of the imaging device 100 detected by the posture detection unit 120. That is, the group image reproduction unit 160 sequentially displays, on the display unit 111, one image from among the images rendered in the rendering memory 170 based on the image display switching instruction output from the analysis unit 130 (an image advancing or returning instruction).

The rendering memory 170 is a rendering buffer for holding the images rendered by the representative image reproduction unit 150 or the group image reproduction unit 160, and supplies the rendered images to the representative image reproduction unit 150 or the group image reproduction unit 160.

The manipulation method determination unit 180 determines the manipulation method when grouped image content is in a group unit displayed on the display unit 111, based on the image management information output from the group image reproduction unit 160. For example, the manipulation method determination unit 180 normalizes the angle information assigned to a plurality of image contents, for each image content, using a range in which the posture of the imaging device 100 is changed, as a reference. The manipulation method determination unit 180 determines the manipulation method by associating the position of the posture of the imaging device 100 with the plurality of image contents, for each image content, based on the normalized angle information, and outputs the determined manipulation method to the group image reproduction unit 160. A method of determining the manipulation method will be described in detail with reference to FIGS. 8A to 14.

(Stored Content of Image Management Information Storage Unit)

FIG. 4 schematically shows stored content of the image management information storage unit 210 in the first embodiment of the present invention. Group identification information 211, image content identification information 212, group presence 213, a representative image 214, a manipulation method 215, and a group type 216 are stored in the image management information storage unit 210.

Identification information for identifying each group is stored in the group identification information 211. Here, the group is an image group including a plurality of image contents associated with one another, the order of which is specified based on a predetermined rule. In the first embodiment of the present invention, an example in which an image group including a plurality of image contents, and image contents not in the image group are assigned group identification information to identify the image contents not in the image group and the image group is shown.

Identification information (image content identification information) for identifying each image content stored in the image content storage unit 200 is stored in the image content identification information 212. For example, the image content identification information of each image content is stored in an image advancing or returning order (e.g., an order of photographing time (record date)).

Angle information corresponding to an imaging operation when the image content stored in the image content storage unit 200 is generated is stored in the angle information 213. For example, when a multi-view image is photographed using the imaging device 100 and the multi-view image generated by the photograph is stored in the image content storage unit 200, an angle upon photographing (an angle when a predetermined position is used as a reference) is stored as the angle information. "Absence" is shown in the field of the image content not assigned the angle information. Here, the multi-view image is a plurality of images generated by an imaging operation changing a view with respect to a target subject (e.g., a face of a person) by moving the imaging device 100 using the target subject as a reference. The imaging operation will be described in detail with reference to FIG. 8A.

Representative image information for specifying a representative image among a plurality of grouped image contents is stored in the representative image 214. In the example shown in FIG. 4, image content identification information (image content identification number) of image content corresponding to the representative image is shown as the representative image information. Further, "absence" is indicated in the field of the non-grouped image content. That is, it is possible to identify whether the image contents are grouped (whether the image contents belong to a group) based on whether the image content identification information is stored in the representative image 214.

A manipulation method when a plurality of grouped image contents are sequentially displayed in the case in which the group image display mode has been set is stored in the manipulation method 215. The manipulation method is a manipulation method relating to the change of the posture of the imaging device 100. For example, "horizontal rotation" refers to a manipulation to sequentially display a plurality of image contents by rotating the imaging device 100 in the direction indicated by the arrow 302 about the arrow 300 (301) shown in FIGS. 1A and 1B to change the posture. Further, for example, "vertical rotation" refers to a manipulation to sequentially display a plurality of image contents by rotating the imaging device 100 in the direction indicated by the arrow 305 about the arrow 303 (304) shown in FIGS. 1A and 1B to change the posture. Further, for example, "horizontal movement" refers to a manipulation to sequentially display a plurality of image contents by moving the imaging device 100 in the direction indicated by the arrows 303 and 304 shown in FIGS. 1A and 1B to change the posture. For example, a "vertical movement" refers to a manipulation to sequentially display a plurality of image contents by moving the imaging device 100 in the direction indicated by the arrows 300 and 301 shown in FIGS. 1A and 1B to change the posture. The imaging device 100 can automatically determine the manipulation method, for example, according to an imaging operation method upon generating the image contents. Further, the manipulation method may be appropriately determined according to the user's preference by the user manipulation.

The type relating to a group (image group) including a plurality of image contents the order of which is specified based on a predetermined rule and that are associated with each other is stored in the group type 216. In FIG. 4, an example in which "multi-shot image" and "multi-view image" are stored as the group type is shown. Here, "multi-shot image" is the type of a group including a plurality of images generated by multi-shot photographing and "multi-view image" is the type of a group including a plurality of images generated by multi-view photographing. "Absence" is indicated in the field of the non-grouped image content. Further, when the representative image display mode has been set, the representative image and the type of a group corresponding to the representative image based on content of the group type 216 can be displayed. This display example is shown in FIG. 5.

The information stored in the group identification information 211, the group presence 213, the representative image 214, the manipulation method 215 and the group type 216 may be recorded in an image file (image content). For example, such information can be recorded as attribute information relating to a still image file. The information recorded in the image content may be used upon reproduction of the image content.

Display Example of Representative Image

Figure 5A:
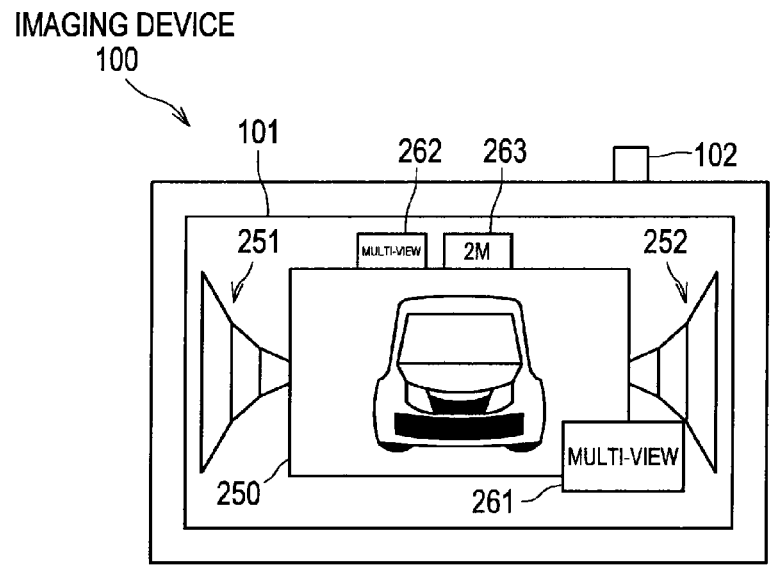
FIG. 5A shows a display example of a representative image displayed on an input/output panel 101 by a representative image reproduction unit 150 in the first embodiment of the present invention.
Figure 5B:
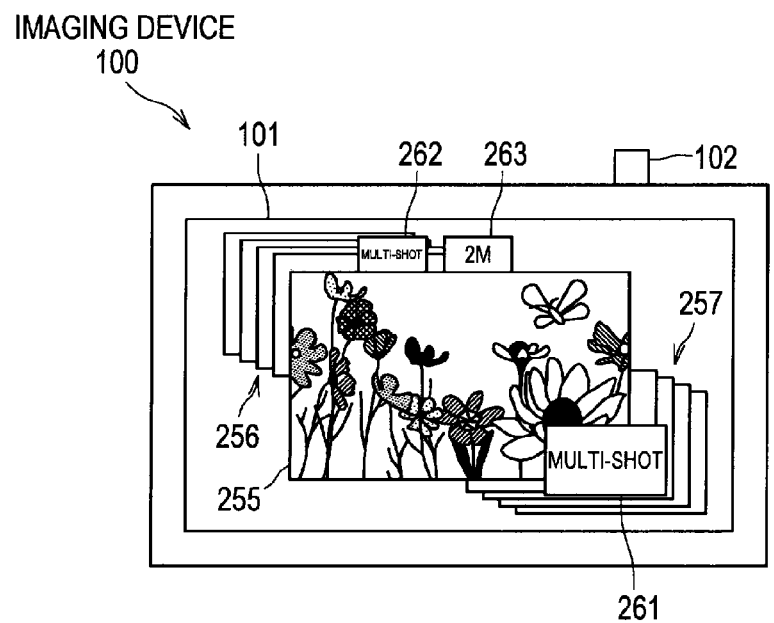
FIG. 5B shows a display example of a representative image displayed on an input/output panel 101 by a representative image reproduction unit 150 in the first embodiment of the present invention.

FIGS. 5A and 5B shows a display example of the representative image displayed on the input/output panel 101 by the representative image reproduction unit 150 in the first embodiment of the present invention. In FIG. 5A, a display example when a representative image of a group in which "multi-view image" is stored in the group type 216 is displayed is shown. Further, in FIG. 5B, a display example in which a representative image of a group in which "multi-shot image" is stored in the group type 216 is displayed is shown.

As shown in FIG. 5A, when the representative image 250 of the group relating to the multi-view image is displayed on the input/output panel 101, manipulation support information (decoration image) 251 and 252 indicating that the group is a group relating to the multi-view image is displayed at both sides of the representative image 250. Further, a group type display area 262 and an image size display area 263 are provided on the representative image 250, and manipulation support information 261 for setting the group image display mode is provided below the representative image 250.

In the group type display area 262, the type of the group corresponding to the displayed representative image is displayed. For example, when the type of the group corresponding to the displayed representative image is a group relating to the multi-view image, "multi-view" is displayed in the group type display area 262.

In the image size display area 263, an image size of each image belonging to the group corresponding to the displayed representative image (e.g., an image size of one image) is displayed.

The manipulation support information 261 is a manipulation button for supporting a manipulation to set the group image display mode upon setting of the representative image display mode. That is, the user can set the group image display mode by pressing the manipulation support information 261. Further, the same letters as the group type in the group type display area 262 is displayed in a rectangle corresponding to the manipulation support information 261.

Further, as shown in FIG. 5B, when a representative image 255 of a group relating to a multi-shot image is displayed on the input/output panel 101, manipulation support information (decoration image) 256 and 257 indicating that the group is the group relating to the multi-shot image is displayed at both sides of the representative image 255. Further, a group type display area 262 and an image size display area 263 are provided on the representative image 255, and manipulation support information 261 for setting the group image display mode is provided below the representative image 255.

Thus, when the representative image display mode has been set, a display aspect of the representative image is changed for each image group based on correlativity (e.g., corresponding to group type) between images in the image group associated with the representative image displayed on the input/output panel 101, and then the representative image is displayed.

As shown in FIG. 5B, when the type of the group corresponding to the displayed representative image is the group relating to the multi-shot image, "multi-shot" is displayed in the group type display area 262. Further, "multi-shot" is displayed in a rectangle corresponding to the manipulation support information 261.

Image Display Transition Example

Figure 6:
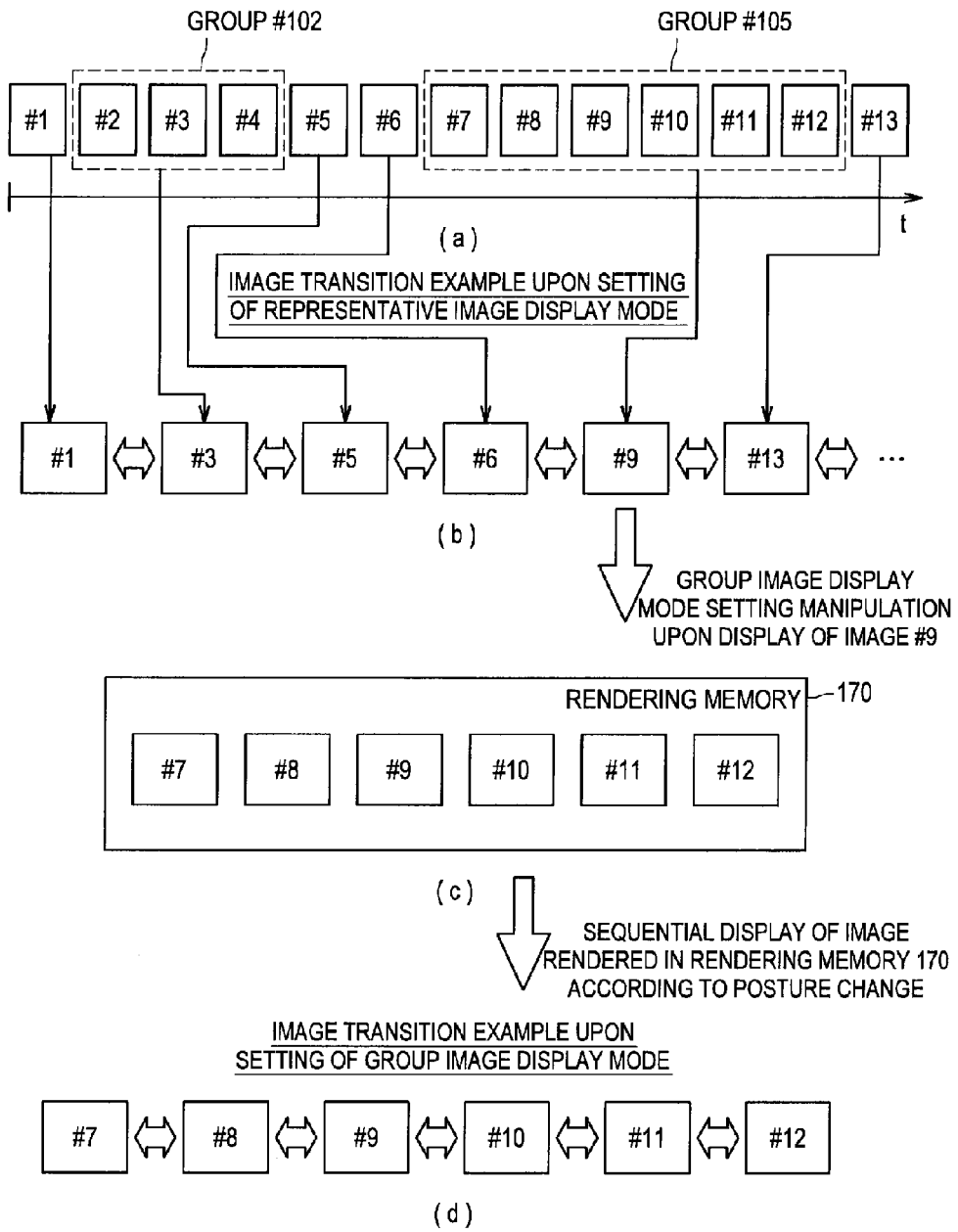
FIG. 6 schematically shows an image display transition example in the input/output panel 101 in the first embodiment of the present invention.

FIGS. 6 and 7 schematically show image display transition examples on the input/output panel 101 in the first embodiment of the present invention. In FIG. 6(a), a case in which the image contents stored in the image content storage unit 200 are arranged according to a predetermined rule (order of image content identification information) is schematically shown. In the example shown in FIG. 6(a), only image contents #1 to #13 among the image contents stored in the image content storage unit 200 are shown. Further, the image contents #1 to #13 correspond to #1 to #13 indicated in the image content identification information 212 of FIG. 4. In FIG. 6, image contents and corresponding images are schematically shown by rectangles with image content identification information (#1 to #13). Further, grouped image contents are surrounded in a group unit by dotted rectangles.

In FIG. 6(b), a transition of images displayed on the input/output panel 101 when the representative image display mode has been set is shown. As shown in FIG. 6(b), non-grouped image contents (#1, #5, #6, and #13) and representative images (#3 and #9) of the grouped image contents are sequentially displayed based on an image advancing manipulation or an image returning manipulation by the user. The image advancing manipulation or the image returning manipulation is performed, for example, using the manipulation member included in the imaging device 100 (e.g., the touch panel or an external manipulation button (not shown)). Further, the image advancing manipulation or the image returning manipulation may be performed, for example, according to the change of the posture of the imaging device 100, similar to setting of the group image display mode.

In FIG. 7(a), a display transition example in which image contents #6, #9 and #13 among the images shown in FIG. 6(b) are sequentially displayed based on the image advancing manipulation or the image returning manipulation by the user is shown.

In FIG. 7, images indicating image contents using rectangles with image content identification information (#6, #8 to #10, and #13) are schematically shown. Thus, it is possible to display each image on the input/output panel 101 based on the user manipulation. Here, when the representative image (e.g., #9) of the grouped image content is displayed on the input/output panel 101 as shown in FIG. 7(a), manipulation support information 261 for setting the group image display mode is displayed. This manipulation support information 261 is the same as the manipulation support information 261 shown in FIG. 5. That is, the user can set the group image display mode by pressing a rectangular area corresponding to the manipulation support information 261. For example, the group image display mode is set when the manipulation support information 261 is pressed in a state in which representative images (e.g., #3 and #9) of the grouped image contents are displayed on the input/output panel 101. Thus, the manipulation to press the manipulation support information 261 becomes an entrance to the group image display mode. Where the group image display mode is set, the images contents belonging to the group corresponding to the representative image displayed when the group image display mode setting manipulation (a manipulation to press the manipulation support information 401) is performed are sequentially displayed.

On the other hand, when the non-grouped image contents (e.g., #6 and #13) are displayed on the input/output panel 101 as shown in FIG. 7(a), the manipulation support information 261 is not displayed. Accordingly, the manipulation to press the manipulation support information 261 will not be performed and the group image display mode will not be set in a state in which the non-grouped image contents (e.g., #6 and #13) have been displayed on the input/output panel 101.

Here, a case in which a group image display mode setting manipulation (the manipulation to press the manipulation support information 261) is performed in a state in which the representative image (#9) of the grouped image content has been displayed on the input/output panel 101 is assumed. In this case, the group image reproduction unit 160 acquires image contents belonging to the group corresponding to the representative image displayed when the group image display mode setting manipulation is performed, from the image content storage unit 200. Further, the group image reproduction unit 160 acquires image management information associated with each image content belonging to the group from the image management information storage unit 210. Subsequently, the manipulation method determination unit 180 determines an image that is an object to be displayed (an image to be displayed) selecting from each image content belonging to the group based on the acquired image management information as well as determining a manipulation method for displaying these images to be displayed. The method of determining this images to be displayed and the method of determining the manipulation method thereof will be described in detail with reference to FIGS. 8A to 14.

Subsequently, the group image reproduction unit 160 renders each image in the rendering memory 170 based on the acquired image content. In this case, the group image reproduction unit 160 renders each image in the rendering memory 170 according a predetermined rule (e.g., the order of image content identification information). An image rendering example in the rendering memory 170 is shown in FIG. 6(c).

In FIG. 6(c), a case in which the image contents belonging to the group corresponding to the representative image displayed when the group image display mode is set are rendered in the rendering memory 170 is schematically shown. When an image content rendering process is thus performed, the group image reproduction unit 160 displays the fact on the input/output panel 101 and does not perform a displaying process in the group image display mode. A display example in this case is shown in FIG. 7(b). Note that FIG. 6(b) shows an image rendering example when all of each image content belonging to a group #105 has been determined as the image to be displayed.

In FIG. 7(b), a display example when the image content rendering process is performed directly after the group image display mode setting manipulation is performed is shown. For example, manipulation support information 402 indicating the image content rendering process superimposed on the representative image (#9) displayed when the group image display mode is set is displayed on the input/output panel 101. When the image content rendering process is terminated, the group image reproduction unit 160 displays manipulation support information for supporting the image display switching manipulation in the group image display mode on the input/output panel 101. The display example is shown in FIG. 7(c).

In FIG. 7(c), a display example when the image content rendering process is terminated after the group image display mode setting manipulation is performed is shown. For example, manipulation support information 403 and 404 for supporting the image display switching manipulation in the group image display mode superimposed on the representative image (#9) displayed when the group image display mode is set is displayed on the input/output panel 101. The manipulation support information 403 and 404 is manipulation guides for supporting a manipulation for displaying each image in the group displayed on the input/output panel 101. The manipulation support information 404 shown in FIG. 7(c) is for supporting manipulation when the user performs a manipulation to rotate the imaging device 100 about the arrow 300 (301) shown in FIG. 1A in a state in which the user holds the imaging device 100 in his or her hand. Further, the manipulation support information 403 is manipulation support information to be displayed at first, which can be deleted by the user's operation or after a certain period time has elapsed. That is, when it is recognized that the user understands the meaning of the message, the message will be deleted. By deleting in this way, it is possible to notify the user that a manipulation to tilt is a right manipulation. Note that each of figures shows each of manipulation support information relatively large, for ease of explanation.

Here, as shown in FIG. 7(c), a setting manipulation to set the representative image display mode in a state in which the group image display mode is set and the manipulation support information 403 and 404 superimposed on the image to be displayed is displayed will be described. When the representative image display mode is set in this state, for example, the user performs a touch manipulation to contact the display surface of the input/output panel 101. When the touch manipulation is performed, the mode is switched from the group image display mode to the representative image display mode (i.e., the representative image display mode is set), as shown by the arrow 405. Directly after the representative image display mode is set as such, a representative image (e.g., image #9) of the group displayed upon setting of the group image display mode is displayed. The representative image display mode may be set by a setting manipulation using the manipulation member, as well as the touch manipulation in the input/output panel 101.

Assignment Example of Angle Information

Figure 8A:
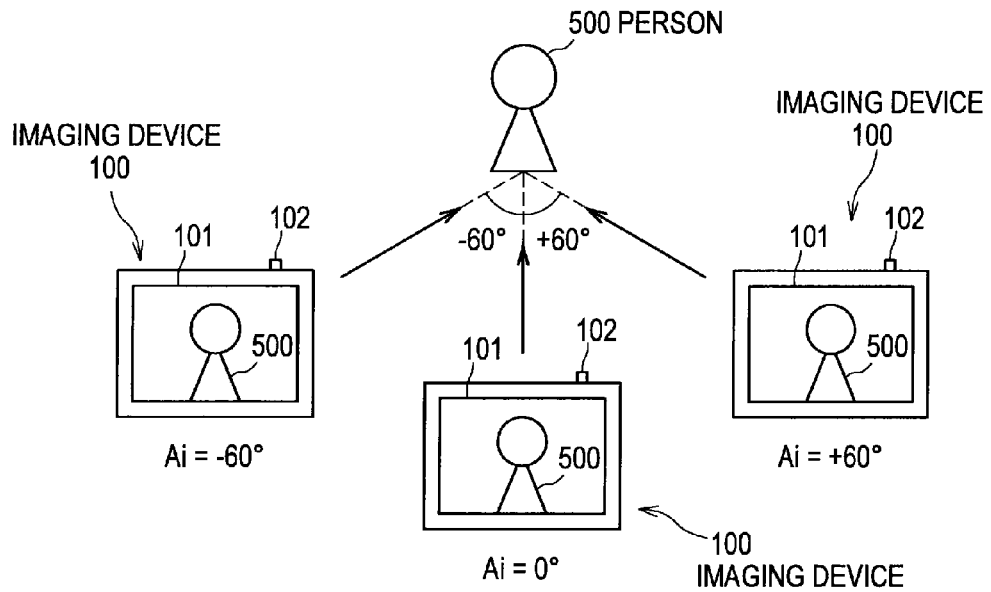
FIG. 8A shows one example of a position relationship between a subject and the imaging device 100 in an imaging operation performed using the imaging device 100, and an imaged image group generated in the imaging operation in the first embodiment of the present invention.
Figure 8B:
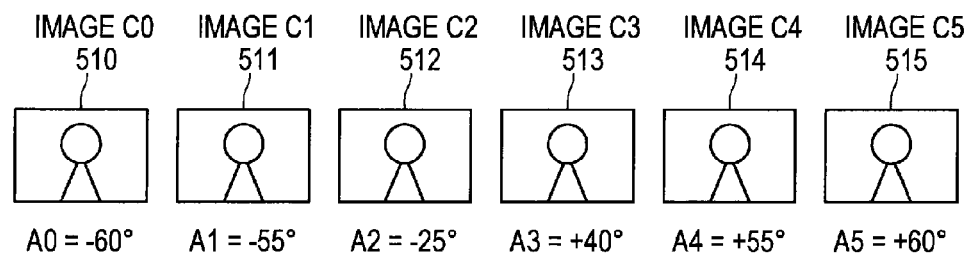
FIG. 8B shows one example of a position relationship between a subject and the imaging device 100 in an imaging operation performed using the imaging device 100, and an imaged image group generated in the imaging operation in the first embodiment of the present invention.

FIGS. 8A and 8B shows one example of a position relationship between the subject and the imaging device 100 in an imaging operation performed using the imaging device 100 and an imaged image group generated in the imaging operation in the first embodiment of the present invention.

In FIG. 8A, a position relationship between the target subject (the face of the person 500) and the imaging device 100 in the imaging operation performed using the imaging device 100 is schematically shown. In the example shown in FIG. 8A, an example in which the face of the person 500 is a target subject and the imaging operation is performed by moving the imaging device 100 to change a view with respect to the face of the person 500 is shown. Specifically, in FIG. 8A, a case in which the front of the person 500 is photographed (when the angle information Ai in the imaging operation is 0 degree) is shown. Similarly, in FIG. 8A, a case in which a right oblique side of the person 500 is photographed (the angle information Ai in the imaging operation is −60 degrees) and a case in which a left oblique side of the person 500 is photographed (the angle information Ai in the imaging operation is +60 degrees) are shown. In FIG. 8A, for example, a face relating to the person 500 (including the person 500 included in each image) is shown in a simplified form. Further, the angle information Ai in the imaging operation performed using the imaging device 100 is shown below the imaging devices 100 (Ai=−60 degrees, Ai=0 degree and Ai=+60 degrees).

In FIG. 8B, an imaged image group (the images (C0 to C5) 510 to 515) generated by the imaging device 100 is shown. Ci is identification information for identifying each image, and i is an integer satisfying 0<=i<=n. In the example shown in FIG. 8B, n=5.

Specifically, the images (C0 to C2) 510 to 512 are imaged images when the right oblique side of the person 500 is photographed (when the angle information Ai in the imaging operation is −60 degrees, −55 degrees, and −25 degrees). Further, the images (C3 to C5) 513 to 515 are imaged images when the left oblique side of the person 500 is photographed (when the angle information Ai in the imaging operation is +40 degrees, +55 degrees, and +60 degrees). In FIG. 8B, for example, the face relating to the person 500 included in the images (C0 to C5) 510 to 515 is shown in a simplified form, similar to FIG. 8A. Further, the angle information Ai in the imaging operation (an angle in the imaging operation of the image Ci) is indicated below each image (A0=−60 degrees, A1=−55 degrees, . . . , A4=+55 degrees, A5=+60 degrees).

Thus, the images (C0 to C5) 510 to 515 generated by changing a view with respect to the target subject (the face of the person 500) are grouped as a multi-view image and stored in the image content storage unit 200. Further, such image management information (e.g., the angle information and the group type) is stored in the image management information storage unit 210. When the images (C0 to C5) 510 to 515 are displayed using the imaging device 100, the images (C0 to C5) 510 to 515 in the group can be sequentially displayed by horizontally rotating the imaging device 100.

Here, the images (C0 to C5) 510 to 515 are images obtained by imaging a face of the same person from different views. Accordingly, the user can obtain the feeling of viewing a three dimensional object (the face of the person 500) by rapidly performing the user manipulation to tilt the imaging device 100 to the left and right and rapidly performing image advancing or image returning. That is, the user manipulation to tilt the imaging device 100 to the left and right gives the user the feeling of viewing a pseudo-three-dimensional image.

Thus, it is possible to enjoy a pseudo-three-dimensional image as a profound image by performing high-speed image advancing or image returning by a gesture manipulation of the user on the image group obtained by photographing the target subject from several angles. That is, when the user desires to three-dimensionally view the object, such as a face of a person or a vehicle, he or she can easily view a pseudo-three-dimensional image of the object through a manual manipulation.

When the image group is displayed as such, a determination of the angle information (the overall rotation angle range and the reference angle) associated with the manipulation method is important. Hereinafter, a method of determining the angle information associated with the manipulation method will be described in detail with reference to the drawings.

Normalization Example of Angle Information

Figure 9A:
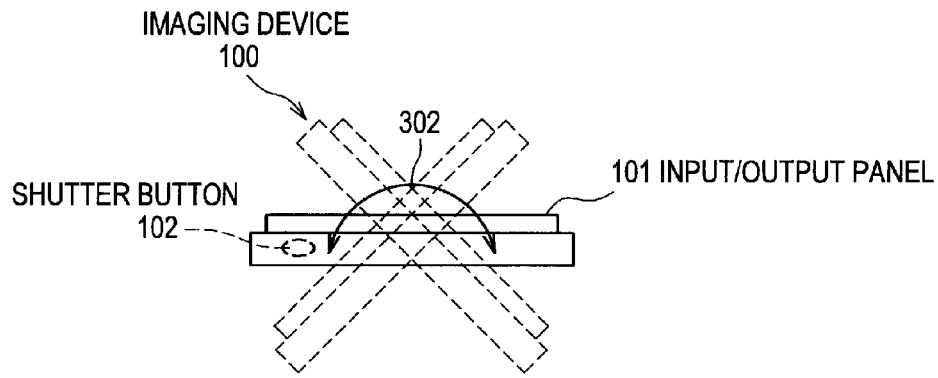
FIG. 9A shows one example of a change of posture of the imaging device 100 and angle information normalization performed by a manipulation method determination unit 180 in the first embodiment of the present invention.
Figure 9B:
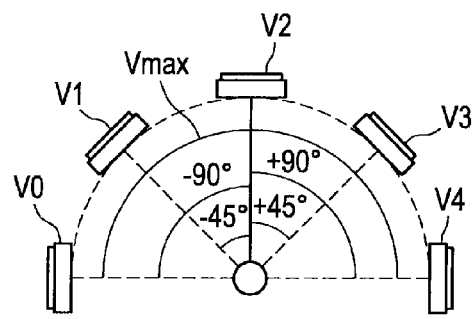
FIG. 9B shows one example of a change of posture of the imaging device 100 and angle information normalization performed by a manipulation method determination unit 180 in the first embodiment of the present invention.
Figure 9C:
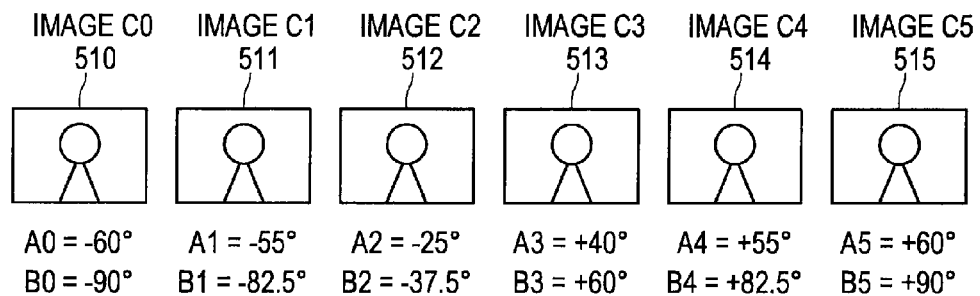
FIG. 9C shows one example of a change of posture of the imaging device 100 and angle information normalization performed by a manipulation method determination unit 180 in the first embodiment of the present invention.

FIGS. 9A to 9C shows one example of a change of the posture of the imaging device 100 and normalization of the angle information performed by the manipulation method determination unit 180 in the first embodiment of the present invention. In FIG. 9A, a transition example of the imaging device 100 in the case in which the image contents stored in the image content storage unit 200 are displayed when the group image display mode has been set is shown. In the example shown in FIG. 9A, an appearance at a bottom side of the imaging device 100 (i.e., a surface opposite to a surface on which the shutter button 102 is provided) is shown. Similarly, in FIGS. 9B, 10(b) and 13(a), the appearance at the bottom side of the imaging device 100 is shown.

In FIG. 9B, a manipulation range (the overall range of the rotation angle) of the imaging device 100 corresponding to the transition of the imaging device 100 is schematically shown. In this example, an example in which image advancing or image returning is performed by rotating the imaging device 100 about the arrow 300 (301) shown in FIGS. 1A and 1B to change the posture is shown. In this case, the tilt angle (reference angle) as a reference when image advancing or image returning is performed is Vi. The tilt angle Vi may be obtained by Equation 1:

$$Vi=(gamma)*j \qquad \text{Equation 1}$$

Here, (gamma) is a value indicating tilt accuracy that can be maintained by a person, for example, without hand shaking. Such a value may be determined in consideration of accuracy or performance of the posture detection unit 120 (a tilt detection device). Further, j is a value satisfying (integer of $-m<=j<=m$), and i is an integer satisfying $0<=i<=n$. In the example shown in FIG. 9B, n=4.

Here, the angle information Ai assigned to each image Ci in the image group is an angle with respect to the target subject in an imaging operation. Accordingly, it is preferable to associate each image Ci with the tilt angle Vi based on the angle information Ai. The angle information Ai is normalized so that the angle information Ai corresponds to the tilt angle Vi. Specifically, the normalization angle information Bi for which the angle information Ai has been normalized may be obtained by Equation 2:

$$Bi=(Vmax/Aabs)*Ai \qquad \text{Equation 2}$$

Here, Vmax is an absolute value of a maximum tilt angle and is an angle at which a user is allowed to view the display screen. Vmax is limited to, for example, a viewing angle of the screen. Further, Aabs is a value (absolute value) indicating a range of the angle information Ai.

In the example shown in FIG. 9B, an example in which Vmax=180 degrees, (gamma)=45 degrees, and m=2 (i.e., $-2<=j<=2$) is shown. Further, the range of the angle information Ai is specified by the angle information A0(=−60 degrees) of the image (C0) 510 and the angle information A5(=+60 degrees) of the image (C5) 515. That is, Aabs=|−60 degrees−60 degrees|=120 degrees.

Accordingly, in the example shown in FIG. 9B, B0=(180 degrees (Vmax)/120 degrees (Aabs))*(−60 degrees (A0))=−90 degrees. Similarly, B1=−82.5 degrees, B2=−37.5 degrees, B3=60 degrees, B4=82.5 degrees, and B5=90 degrees. Such normalization angle information Bi is calculated by the manipulation method determination unit 180.

In FIG. 9C, the images (C0 to C5) 510 to 515, angle information Ai assigned to the images and normalization angle information Bi calculated for the images are associated with one another and shown.

The image Ci can be properly assigned to the tilt angle (reference angle) Vi by normalizing the angle information in the imaging operation associated with the image Ci.

Association Example Between Images to be Displayed and Tilt Angle

Figure 10:
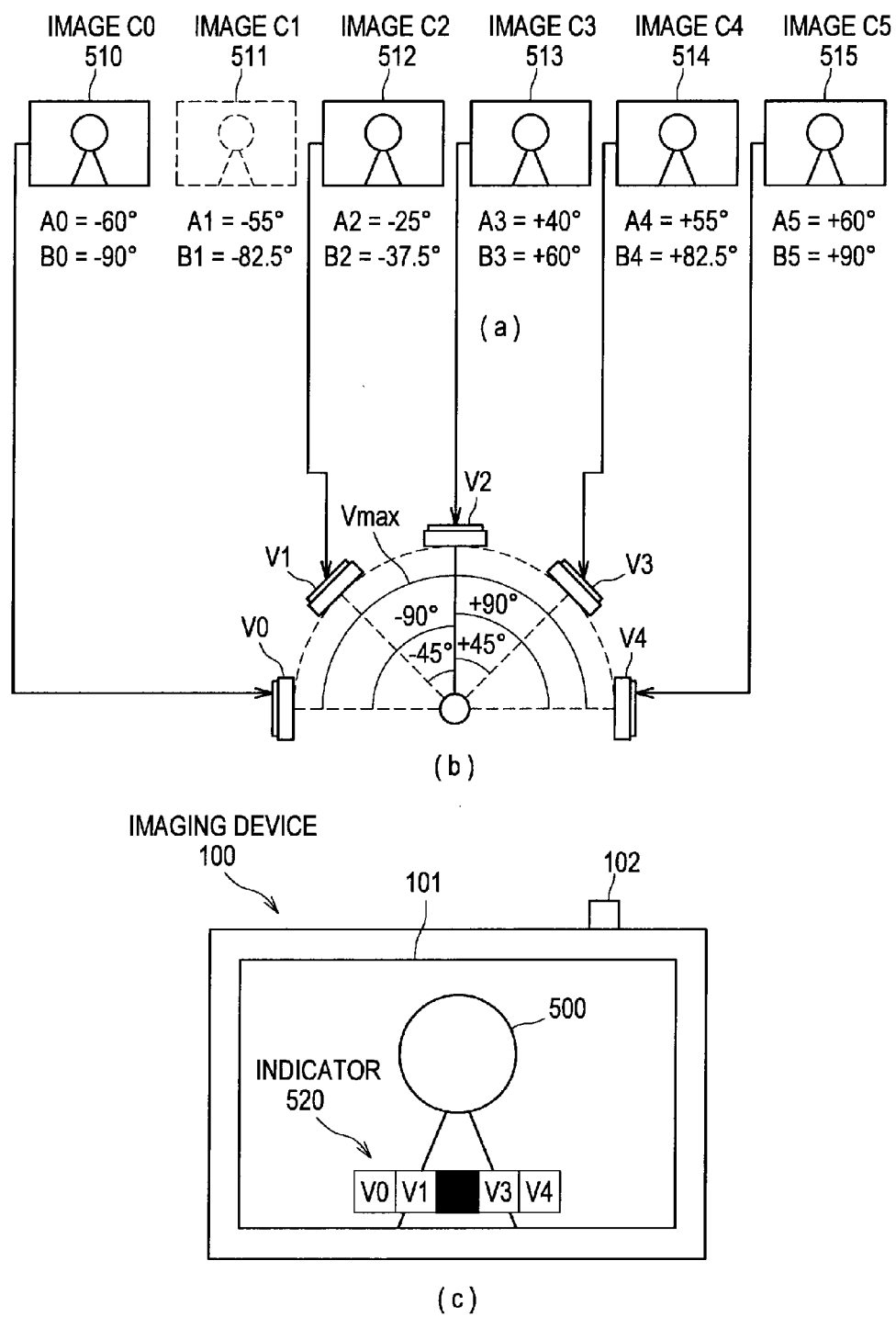
FIG. 10 shows one example of a method of associating an image to be displayed and a tilt angle range in the manipulation method determination unit 180, and an image displayed after the association and manipulation support information in the first embodiment of the present invention.

FIG. 10 shows one example of a method of associating images to be displayed and the tilt angle range in the manipulation method determination unit 180, and the images displayed after the association and manipulation support information in the first embodiment of the present invention. In FIGS. 10(*a*) and (*b*), the method of associating the images to be displayed and the tilt angle range in the manipulation method determination unit 180 is schematically shown.

In FIG. 10(*a*), images (C0 to C5) 510 to 515, angle information Ai assigned to the images, and normalization angle information Bi calculated for the images are associated with one another and shown. The example shown in FIG. 10(*a*) is the same as that shown in FIG. 9C except that a contour corresponding to a rectangle and a person 500 corresponding to the image (C1) 511 is indicated by a dotted line.

In FIG. 10(*b*), a manipulation range of the imaging device 100 (an overall range of the rotation angle) corresponding to a transition of the imaging device 100 is schematically shown. The example shown in FIG. 10(*b*) is the same as that shown in FIG. 9B.

Here, in the example shown in FIGS. 10(*a*) and (*b*), the number of the images (C0 to C5) 510 to 515 (6) is greater than the number of tilt angles (reference angles) Vi (5). When the number of images belonging to the group to be displayed is greater than the number of tilt angles (reference angles) Vi, an interleaving process is performed on the images belonging to the group to be displayed. That is, the manipulation method determination unit 180 extracts a predetermined number of images from among the images belonging to the group to be displayed, as images to be displayed, so that the number of the images is in the range of the number of tilt angles (reference angles) Vi.

Specifically, the image Ci associated with the normalization angle information Bi closest to the tilt angle (reference angle) Vi is selected as an image CCi for each tilt angle (reference angle) Vi from the image group (image Ci ($0<=i<=n$)) for which the normalization angle information Bi has been calculated.

In FIG. 10, an example in which the image Ci associated with the normalization angle information Bi closest to the tilt angle (reference angle) Vi from the tilt angle (reference angle) V0 to V4 is selected, and the selected image Ci and the tilt angle (reference angle) Vi are associated with each other is shown.

Specifically, the image C0 associated with the normalization angle information B0(=−90 degrees) closest to the tilt angle V0(=−90 degrees) is selected and associated with the tilt angle V0, as an image CC0. Similarly, the image C2 associated with the normalization angle information B2(=−37.5 degrees) closest to the tilt angle V1(=−45 degrees) is selected and associated with the tilt angle V1, as an image CC1. Further, the image C3 associated with the normalization angle information B3(=+60 degrees) closest to the tilt angle V2(=0 degree) is selected and associated with the tilt angle V2, as an image CC2. Further, the image C4 associated with the normalization angle information B4(=+82.5 degrees) closest to the tilt angle V3(=45 degrees) is selected and associated with the tilt angle V3, as an image CC3. Further, the image C5 associated with the normalization angle information B5(=+90 degrees) closest to the tilt angle V4(=90 degrees) is selected and associated with the tilt angle V4 as an image CC4.

That is, CCi(={C0, C2, C3, C4, C5}={CC0, CC1, CC2, CC3, CC4}) is selected from the image group (image Ci ($0<=i<=5$)).

The selected images CCi associated with the tilt angles Vi are sequentially displayed according to the tilt of the imaging device 100. For example, when the posture of the imaging device 100 is in a state of the tilt angle (reference angle) Vi, the image CCi associated with the tilt angle (reference angle) V is displayed. The image CCi continues to be displayed until the posture of the imaging device 100 becomes the tilt angle (reference angle) Vi−1 or the tilt angle (reference angle) Vi+1.

In FIG. 10(*c*), a display example when each image CCi associated with the tilt angle Vi by the association method shown in FIG. 10 are displayed on the input/output panel 101 is shown. In the example shown in FIG. 10(*c*), an example in which manipulation support information 520 superimposed on the image to be displayed (the image CCi associated with the tilt angle Vi) is displayed is shown.

The manipulation support information 520 is an indicator indicating a relationship between the images belonging to the group to be displayed (all extracted images to be displayed) and images displayed on the input/output panel 101 when the group image display mode has been set. Specifically, the manipulation support information 520 indicates the relationship between all the extracted images to be displayed (C0 and C2 to C5) 510, and 512 to 515 and one image displayed on the input/output panel 101. For example, a rectangular area in the manipulation support information 520 corresponding to one image displayed on the input/output panel 101 among all the images (C0 and C2 to C5) 510 and 512 to 515 has a different display aspect from other areas. In the example shown in FIG. 10(c), corresponding symbols (V0 to V4) are added to rectangles indicating the manipulation support information 520, for ease of explanation.

That is, in the state shown in FIG. 10(c), a state in which the image (C3) 513 among the images to be displayed (C0 and C2 to C5) 510 and 512 to 515 is displayed on the input/output panel 101 is shown. Further, when the imaging device 100 is rotated to the left and exceeds V1 shown in FIG. 10(b), the rectangular area V1 in the manipulation support information 520 has a different display aspect from the other areas. Further, when the imaging device 100 is rotated to the left and exceeds V0 shown in FIG. 10(b), the rectangular area V0 in the manipulation support information 520 has a different display aspect from the other areas. On the other hand, when the imaging device 100 is rotated to the right and exceeds V3 and V4 shown in FIG. 10(b), the rectangular areas V3 and V4 in the manipulation support information 520 similarly have different display aspects from the other areas.

Thus, when the group image display mode has been set, the total number of images to be displayed and a position of a display image in all the images to be displayed (a position in a display order) can be easily recognized by displaying both the image to be displayed and the indicator.

In the foregoing, the example in which the angle information assigned to each image is normalized, the images are assigned to the angles at certain intervals, and the images are displayed according to the angles has been shown. Here, the tilt angle (reference angle) may be determined according to the interval of the calculated normalization angle information of each image and each image may be displayed according to the angle. Further, when the indicator is displayed as the manipulation support information, the display area of the indicator may be calculated according to the interval of the calculated normalization angle information of each image. A method of calculating the display area of the indicator and a display example are shown in FIGS. 11 and 12.

(Variant of Indicator Display)

Figure 11:
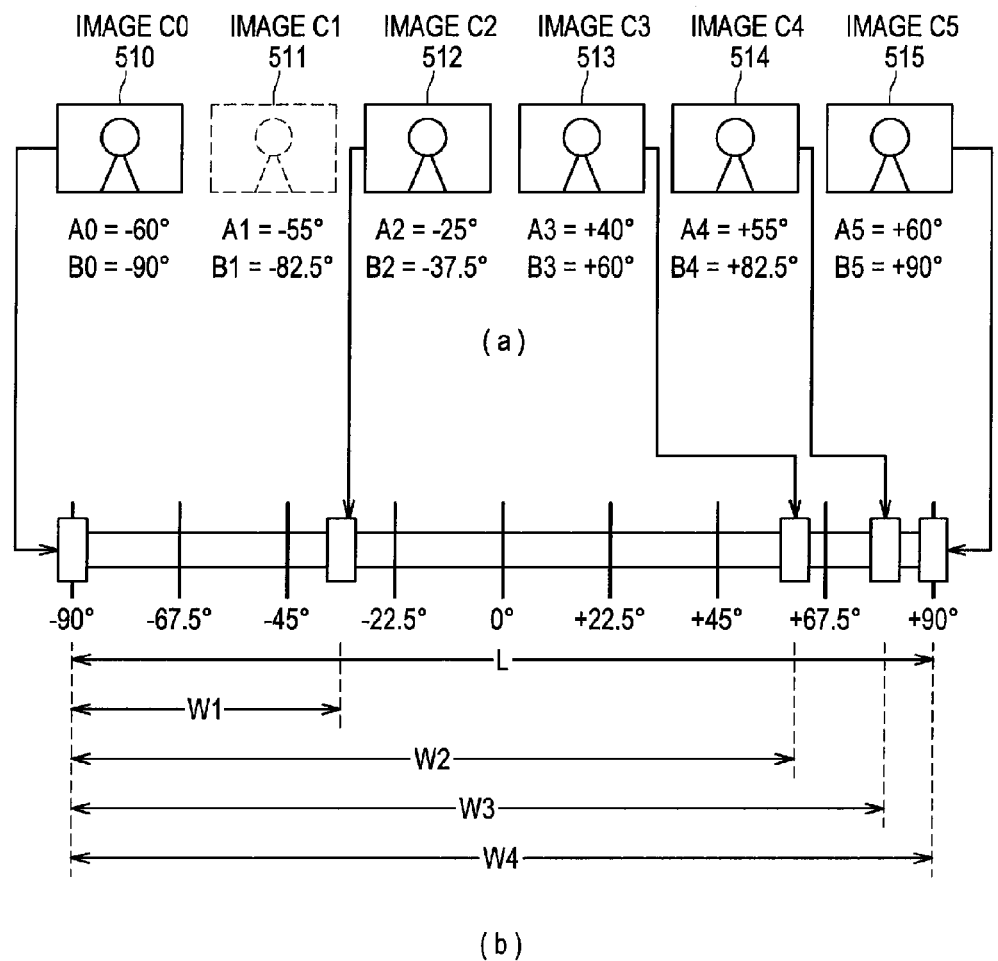
FIG. 11 schematically shows a method of calculating a display area of an indicator in the manipulation method determination unit 180 in the first embodiment of the present invention.
Figure 12:
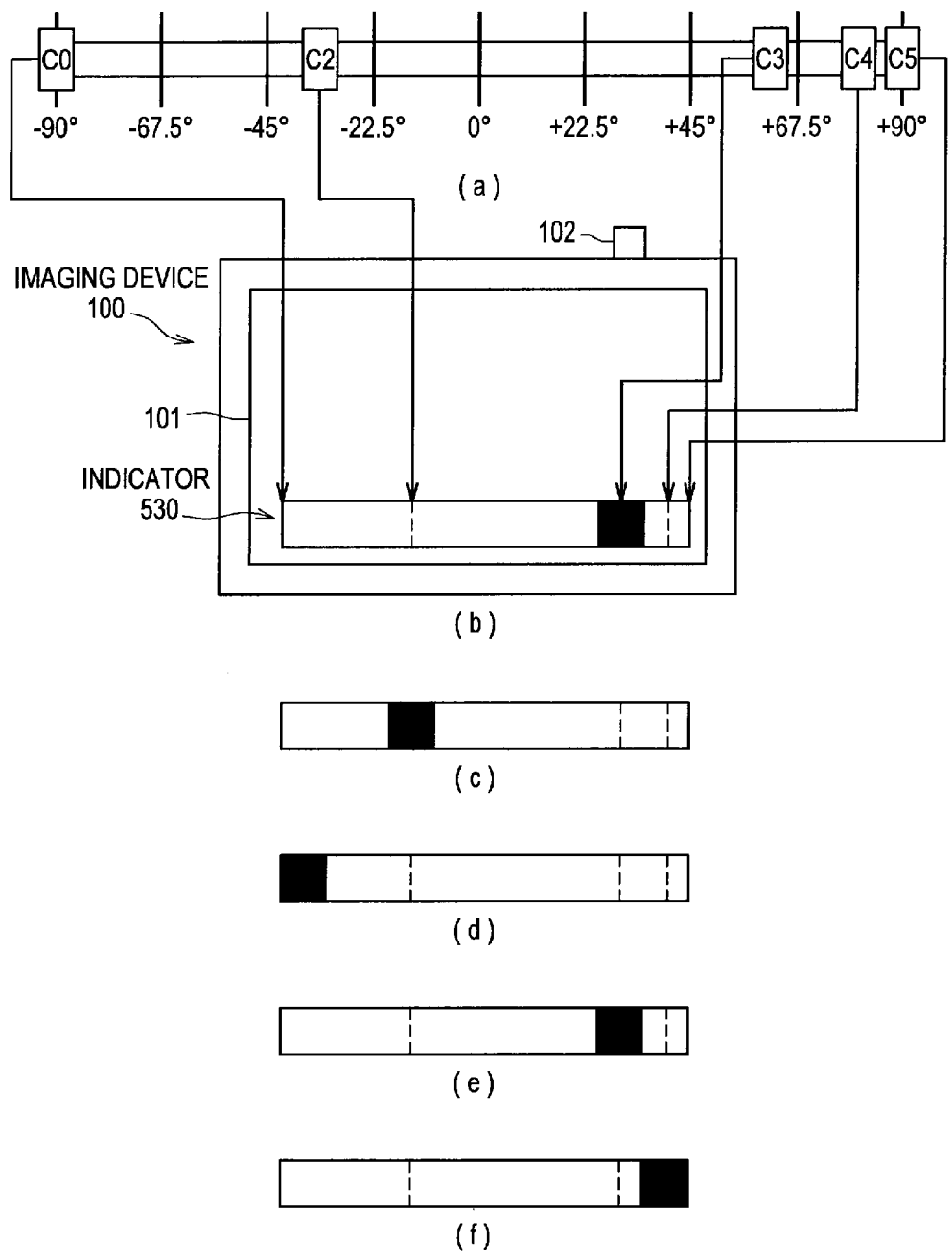
FIG. 12 shows a display example of an indicator based on a display area of an indicator calculated by the manipulation method determination unit 180 in the first embodiment of the present invention.

FIG. 11 schematically shows a method of calculating the display area of the indicator in the manipulation method determination unit 180 in the first embodiment of the present invention.

In FIG. 11(a), images (C0 to C5) 510 to 515, angle information Ai assigned to the images, and normalization angle information Bi calculated for the images are associated with one another and shown. Since the example shown in FIG. 11(a) is the same as that shown in FIG. 10(a), a description thereof will be omitted herein.

In FIG. 11(b), a relationship between the calculated display area and the indicator is schematically shown. For example, the manipulation method determination unit 180 performs normalization on the normalization angle information Bi calculated for the images (C0 to C5) 510 to 515. Specifically, the manipulation method determination unit 180 calculates the normalization angle information BBi(=normalization angle information of CCi+90 degrees). The display area Wi of the indicator may be obtained by Equation 3 using the normalization angle information BBi.

$$Wi = BBi/V\max *L \qquad \text{Equation 3}$$

Here, L is a value indicating a length of the indicator displayed on the input/output panel 101. Further, BBi is a value calculated by the above-described normalization.

Here, the display area Wi of the indicator is a value indicating a length from a left end in the indicator (a length L) shown in FIG. 11(b). A display example based on the calculated display area Wi of the indicator is shown in FIG. 12.

FIG. 12 shows a display example of the indicator based on the display area of the indicator calculated by the manipulation method determination unit 180 in the first embodiment of the present invention.

In FIG. 12(a), the relationship between the display area Wi calculated in the example shown in FIG. 11 and the indicator is schematically shown. The example shown in FIG. 12(a) is the same as that shown in FIG. 11(b) except that symbols (C0 and C2 to C5) of images are added to rectangles corresponding to positions on the indicator specified by the display area Wi calculated in the example shown in FIG. 11.

In FIG. 12(b), a state in which an indicator (manipulation support information) 530 corresponding to the relationship between the display area Wi and the indicator shown in FIG. 12(a) is displayed on the input/output panel 101 is shown. In the example shown in FIG. 12(b), a state in which an area corresponding to the image (C3) 513 has a different display aspect from other areas is shown.

In FIG. 12(c) to (f), a display state on the input/output panel 101 of the indicator 530 corresponding to the relationship between the display area Wi and the indicator shown in FIG. 12(a) is shown. In the example shown in FIG. 12(c), a state in which an area corresponding to the image (C2) 512 has a different display aspect from the other areas is shown, and in the example shown in FIG. 12(d), a state in which an area corresponding to the image (C0) 510 has a different display aspect from the other areas is shown. Further, in the example shown in FIG. 12(e), a state in which an area corresponding to the image (C4) 514 has a different display aspect from the other areas is shown, and in the example shown in FIG. 12(f), a state in which an area corresponding to the image (C5) 515 has a different display aspect from the other areas is shown.

In the above description, the case in which image contents stored to be associated with the angle information are displayed has been described by way of example. However, a case in which image contents in which angle information is not recorded in an imaging operation are displayed is assumed. Hereinafter, the case in which the image contents in which angle information is not recorded in the imaging operation is displayed will be described.

Figure 13:
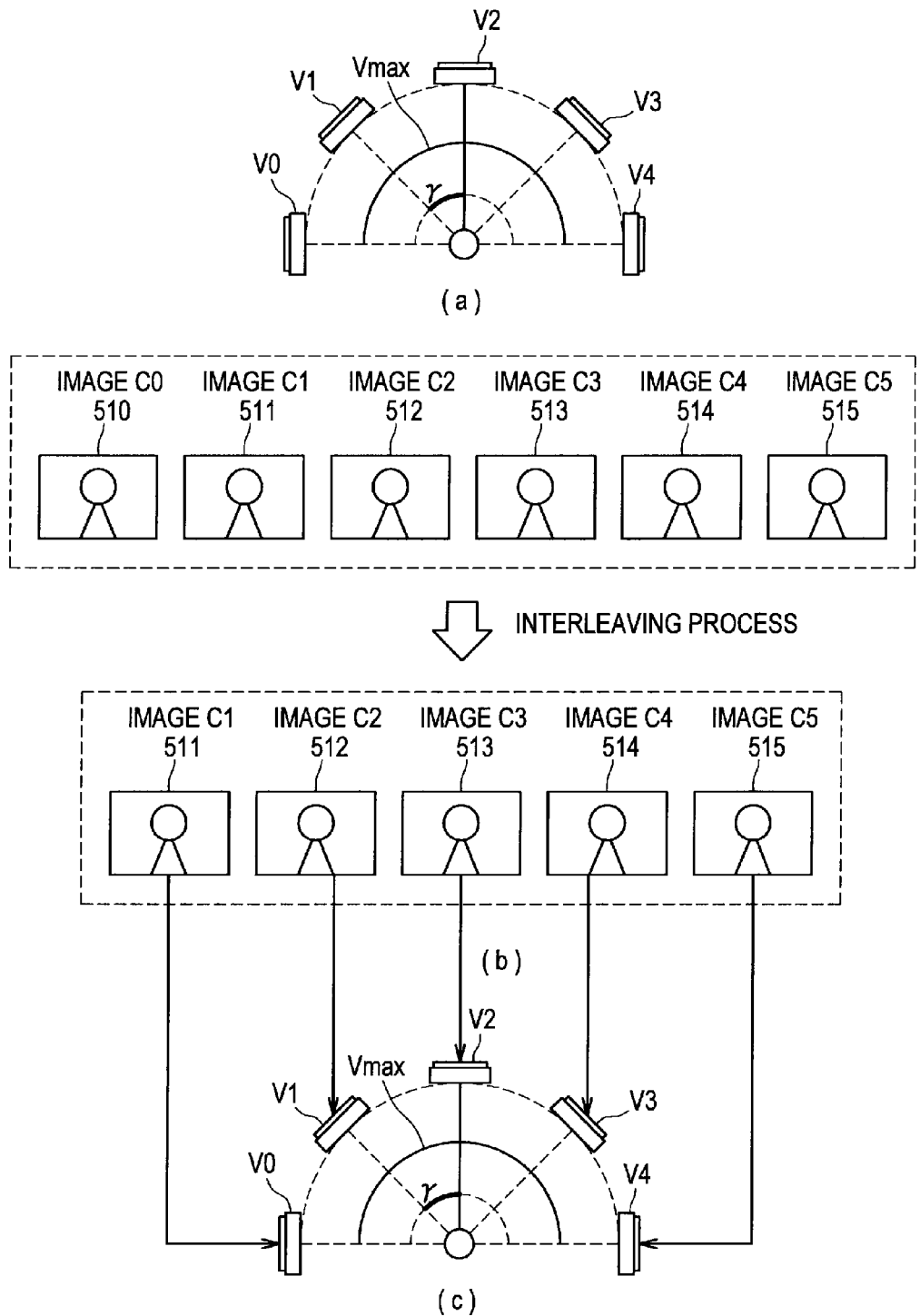
FIG. 13 schematically shows a method of determining the number of images to be displayed and a method of interleaving images to be displayed in the manipulation method determination unit 180 in the first embodiment of the present invention.

Determination Example of the Number of Images to be Displayed and Interleaving Example of Images to be Displayed FIG. 13 schematically shows a method of determining the number of images to be displayed and a method of interleaving the images to be displayed in the manipulation method determination unit 180 in the first embodiment of the present invention.

Here, if the number of images to be displayed is great in the case in which image content in which angle information is not recorded in an imaging operation is displayed, image advancing or image returning is likely to be performed even when a tilt manipulation of the imaging device 100 by a user is small. In this case, unintentional image advancing or image returning is assumed to be performed. In the case in which image content in which the angle information is not recorded in the imaging operation is displayed, the number of images to be displayed is determined according to a range in which the tilt manipulation of the imaging device 100 can be performed by the user, and only the images to be displayed are displayed.

In FIG. 13(a), a manipulation range (overall rotation angle range) of the imaging device 100 corresponding to the transition of the imaging device 100 is schematically shown. The manipulation range of the imaging device 100 shown in FIG. 13(a) is substantially the same as that shown in FIG. 9B, for example.

For example, when the manipulation method determination unit 180 determines the number M of images to be displayed, the manipulation method determination unit 180 may obtain the number M using Equation 4.

$$M = V\max/(\text{gamma}) + 1 \qquad \text{Equation 4}$$

Here, M is a value indicating the number of images that can be displayed. Further, Vmax is an absolute value of a maximum tilt angle, similar to Equation 2. Further, (gamma) is a value indicating tilt accuracy that can be maintained by a person, for example, without hand shaking, similar to Equation 1.

In the example shown in FIG. 13(a), the angle Vmax is assumed to be 180 degrees and the angle (gamma) is assumed to be 45 degrees. In this case, the number of the images to be displayed is calculated as M=5((180 degrees/45 degrees)+1). Further, the images belonging to the group to be displayed are images (C0 to C5) 510 to 515 shown in FIG. 13(b).

Here, in the example shown in FIG. 13, the number of the images (C0 to C5) 510 to 515 (6) is greater than the number M of images to be displayed (5). When the number of images belonging to the group to be displayed is greater than the number M of images to be displayed (5), it is necessary to perform interleaving so that the number of images to be displayed is equal to or less than the number M of images to be displayed. In FIG. 13(b), the interleaving process (an extracting process) will be described.

In FIG. 13(b), a flow of the interleaving process of images to be displayed is shown. In this example, an example in which five images are extracted from the six images (images C0 to C5) when 5 is determined as the number M of the images to be displayed is shown.

For example, when the manipulation method determination unit 180 extracts the images to be displayed, Equation 5 is calculated for each image Ci belonging to the group to be displayed.

$$i \bmod D < (D-M) \qquad \text{Equation 5}$$

Here, x mod y is a value indicating x divided by y. Further, D is the number of images to be displayed and M is the number of images that can be displayed.

Specifically, the manipulation method determination unit 180 determines whether $i \bmod D < (D-M)$ is satisfied for each image Ci belonging to the group to be displayed. The manipulation method determination unit 180 removes the image Ci for which $i \bmod D < (D-M)$ is satisfied from among the images to be displayed. That is, the manipulation method determination unit 180 extracts the image Ci for which $i \bmod D < (D-M)$ is not satisfied, as the image to be displayed, and uses the extracted image Ci as an image CCi.

For example, in the example shown in FIG. 13(b), since D=6, M=5, and D−M=1, the image C0 is excluded from the images to be displayed. That is, CCi (={C1, C2, C3, C4, C5}={CC0, CC1, CC2, CC3, CC4}) is extracted from among the image group (image Ci (0<=i<=5)).

In FIG. 13(c), an example in which the extracted image CCi and the tilt angle (reference angle) Vi are associated with each other is schematically shown. As shown in FIG. 13(c), the extracted CCi={C1, C2, C3, C4, C5} is assigned to the tilt angle (reference angle) Vi, and image CCi is associated with the tilt angle (reference angle) Vi.

Display Area Setting Example of Indicator

Figure 14:
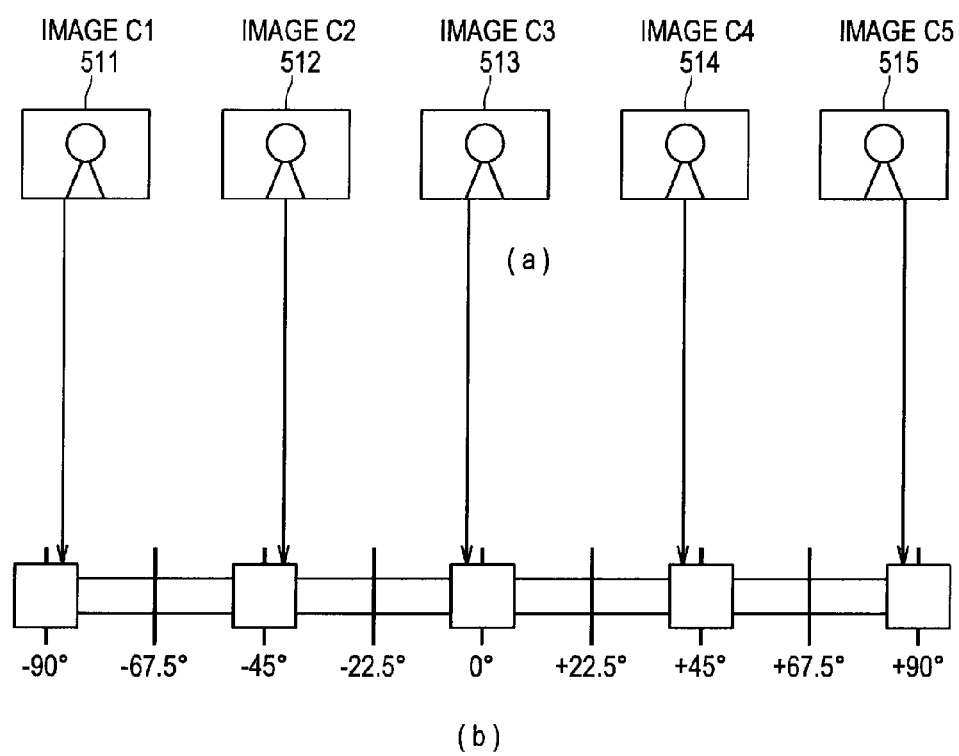
FIG. 14 schematically shows a method of setting the display area of the indicator in the manipulation method determination unit 180 in the first embodiment of the present invention.

FIG. 14 schematically shows a method of setting the display area of the indicator in the manipulation method determination unit 180 according to the first embodiment of the present invention. In FIG. 14(a), the images (C1 to C5) 511 to 515 extracted in the example shown in FIG. 13 are shown.

In FIG. 14(b), a relationship between the set display area and the indicator is schematically shown. When the image contents in which the angle information is not recorded in the imaging operation are displayed as shown in FIG. 13, the image contents are assigned to the tilt angles (reference angles) Vi at certain intervals. Accordingly, even when the display area of the indicator is set as shown in FIG. 14(b), the image contents may be associated with the tilt angles (reference angles) Vi and assigned at certain intervals.

In the foregoing, the example in which the images to be displayed, and the manipulation support information (e.g., the indicator) indicating the total number of images to be displayed and the display image positions (positions in a display order) in all the images are displayed when the group image display mode has been set has been shown. Here, the images to be displayed, and manipulation support information (e.g., tilt meter) indicating the relationship between the posture of the imaging device 100 and image advancing or image returning may be displayed. Further, such manipulation support information (e.g., the indicator and the tilt meter) may be simultaneously displayed. Hereinafter, an example in which the manipulation support information (tilt meter) the relationship between the posture of the imaging device 100 and image advancing or image returning is displayed will be described.

Display Transition Example of Tilt Meter Based on Rotation Angle

Figure 15:
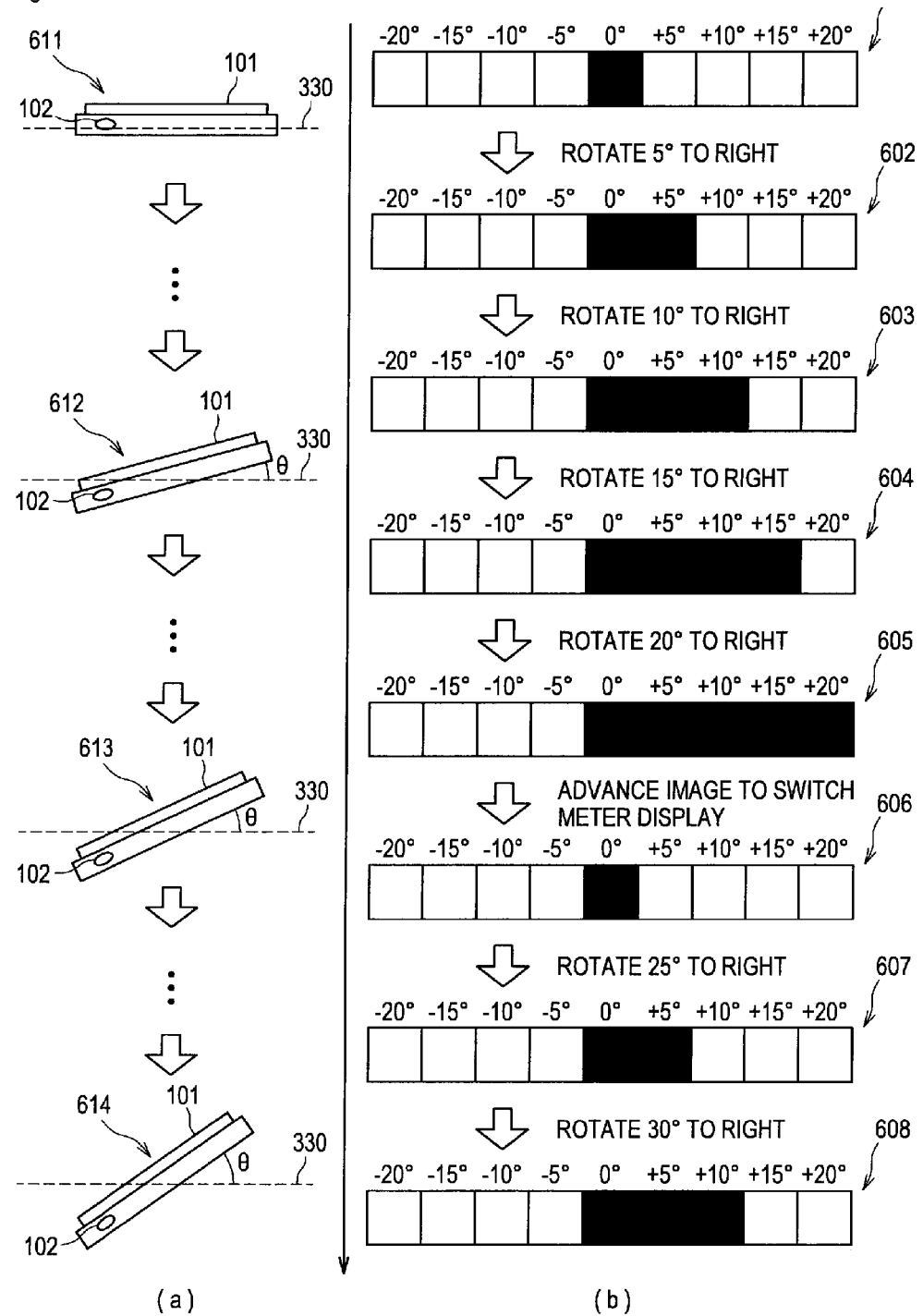
FIG. 15 shows a display transition example of manipulation support information (tilt meter) displayed by the group image reproduction unit 160 in the first embodiment of the present invention.

FIG. 15 shows a display transition example of manipulation support information (a tilt meter) displayed by the group image reproduction unit 160 in the first embodiment of the present invention. In this example, a display transition example when image advancing or image returning is performed according to the rotation angle of the imaging device 100 is shown. Further, in this example, an example in which the reference angle when image advancing or image returning is performed is 20 degrees and image advancing or image returning is performed each time the tilt angle of the imaging device 100 exceeds 20 degrees is shown. In the example shown in FIGS. 15 to 17C, a corresponding angle is indicated on each rectangle of the tilt meter.

In FIG. 15(a), a transition of the imaging device 100 when the imaging device 100 is tilted to the right by the user is shown. In FIG. 15(b), when the imaging device 100 is tilted to the right by the user, a display transition of the tilt meter displayed according to the tilt angle is shown. FIGS. 15(a) and (b) correspond to each other, but a portion of FIG. 15(b) is omitted.

For example, a state 611 shown in the top of FIG. 15(*a*) is a state in which the imaging device 100 exists on the same plane as a horizontal plane 330. In this case, as shown in the state 601 in the top of FIG. 15(*b*), only a rectangular area at a middle portion of the tilt meter has a different display aspect (e.g., black color) from other areas. Hereinafter, the different display aspect from the other areas is referred to as a black color.

For example, as in states 612 and 613 shown in FIG. 15(*a*), a case in which the user rotates the imaging device 100 to the right in a state in which the user holds the imaging device 100 is assumed. In this case, when the rotation angle (theta) at which the imaging device 100 is rotated to the right reaches 5 degrees, the two rectangular areas at the right from the middle of the tilt meter become black as shown in a state 602 of FIG. 15(*b*), but image advancing is not performed. Further, when the user rotates the imaging device 100 to the right in a state in which the user holds the imaging device 100, the rectangular areas at the right from the middle of the tilt meter become sequentially black according to the rotation angle (theta). Specifically, when the rotation angle (theta) reaches 10 degrees, the two rectangular areas at the right from the middle of the tilt meter become black (state 603), and when the rotation angle (theta) reaches 15 degrees, the three rectangular areas at the right from the middle of the tilt meter become black (state 604). Here, in the case of the state 601 to 604, image advancing is not performed.

Subsequently, when the rotation angle (theta) at which the imaging device 100 is rotated to the right reaches 20 degrees, all the portions at the right from the middle of the tilt meter are black as shown in a state 605, and an indication of reaching the tilt of image advancing is displayed and image advancing is performed.

After image advancing is performed and a next image is displayed on the input/output panel 101, only the rectangular area in the middle portion of the tilt meter becomes black as shown in state 606. That is, the tilt meter in the state 606 becomes the same as the state in which the imaging device 100 exists on the same plane as the horizontal plane 330 (state 601).

Similarly, when the user rotates the imaging device 100 to the right rotation in a state in which the user holds the imaging device 100, the rectangular area in the tilt meter becomes black according to the rotation angle (theta), as shown in states 607 and 608 of FIG. 15(*b*).

Here, when the imaging device 100 is rotated to the right to an angle at which the last image among the images to be displayed is sent, the tilt meter enters a state that is the same as the state 605. Accordingly, even when further rotation to the right is performed, an indication indicating that image advancing is not performed may be notified of.

Similarly, when the imaging device 100 is rotated to the left, the rectangular areas at the left from the middle of the tilt meter become sequentially black.

While the example in which image advancing or image returning is performed each time the imaging device 100 exceeds the reference angle (e.g., 20 degrees) has been shown in the foregoing, image advancing or image returning may be performed by another manipulation method. Hereinafter, an example in which image advancing or image returning is performed by another manipulation method is shown.

FIG. 16 shows a display transition example of the manipulation support information (the tilt meter) displayed by the group image reproduction unit 160 in the first embodiment of the present invention. In this example, a display transition example in which image advancing and image returning are sequentially performed when the rotation angle of the imaging device 100 reaches a certain angle and then such a state is maintained is shown. Further, in this example, an example in which image advancing is sequentially performed in the case in which the reference angle when image advancing or image returning is performed is 20 degrees and the tilt angle of the imaging device 100 is maintained at 20 degrees is shown. In FIGS. 16 to 17C, the transition example of the imaging device 100 shown in FIG. 15(*a*) is omitted.

In FIG. 16(*a*), a display transition of the tilt meter displayed according to the tilt angle when the imaging device 100 is tilted to the right by the user is shown. States 621 to 625 shown in FIG. 16(*a*) correspond to the states 601 to 605 shown in FIG. 15(*b*). That is, when the user rotates the imaging device 100 to the right in a state in which the user holds the imaging device 100 as in the state 612 and 613 of the imaging device 100 shown in FIG. 15(*a*), the same states as the states 601 to 604 shown in FIG. 15(*b*) are obtained. Further, in the case of the states 621 to 624, image advancing is not performed.

Subsequently, when the rotation angle (theta) at which the imaging device 100 is rotated to the right reaches 20 degrees, all right portions from a middle of the tilt meter become black as shown in the state 625, an indication of reaching the tilt of image advancing is displayed, and image advancing is performed.

In FIG. 16(*b*), a display example of the tilt meter when the rotation angle (theta) at which the imaging device 100 is rotated to the right reaches 20 degrees and then the rotation angle (theta) is maintained (or when a state of the rotation angle (theta) or more is maintained) is shown.

When the rotation angle (theta) at which the imaging device 100 is rotated to the right reaches 20 degrees and then the rotation angle (theta) is maintained, image advancing is performed, and after a next image is displayed on the input/output panel 101, the state transitions to the state 626. This state 626 is a state in which the state 625 is maintained. That is, the tilt meter in the state 626 becomes the same as the state (state 625) in which the rotation angle (theta) at which the imaging device 100 is rotated to the right reaches 20 degrees. Further, in the state in which the rotation angle (theta) is maintained, image advancing is performed at certain intervals.

In FIG. 16(*c*), a display example of the tilt meter when the rotation angle (theta) at which the imaging device 100 is rotated to the right reaches 20 degrees and then the rotation angle (theta) is returned is shown.

When the rotation angle (theta) at which the imaging device 100 is rotated to the right reaches 20 degrees and then the rotation angle (theta) is returned (i.e., when the rotation angle (theta) is less than 20 degrees), image advancing is performed, a next image is displayed on the input/output panel 101, and the state transitions to state 627. That is, when the rotation angle (theta) at which the imaging device 100 is rotated to the right reaches 20 degrees and then the rotation angle (theta) is returned, the display of the tilt meter is returned according to the returned angle and image advancing is ceased.

Similarly, when the imaging device 100 is rotated to the left, the rectangular areas at the left from the middle of the tilt meter become sequentially black.

In the foregoing, an example in which image advancing or image returning is performed based on whether the rotation angle of the imaging device 100 exceeds a reference angle of image advancing or image returning has been shown. Here, for example, image advancing or image returning may be performed based on whether the rotational angular velocity of the imaging device 100 exceeds a reference. Hereinafter, an example in which image advancing or image returning is performed based on whether the rotational angular velocity of the imaging device 100 exceeds a reference will be described.

Display Transition Example of Tilt Meter Based on Rotational Angular Velocity

FIGS. 17A to 17C shows a display transition example of manipulation support information (a tilt meter) displayed by the group image reproduction unit 160 in the first embodiment of the present invention. In this example, a display transition example when image advancing or image returning is performed according to the rotational angular velocity (rotation angle/sec) of the imaging device 100 is shown. That is, in this example, an example in which image advancing or image returning is performed according to whether the device reaches a certain angular velocity by one rotation manipulation is shown. Further, in this example, an example in which the rotational angular velocity (rotation angle/sec) when image advancing or image returning is performed is 20 degrees/sec and image advancing or image returning is performed each time the rotational angular velocity of the imaging device 100 exceeds 20 degrees/sec is shown.

In FIG. 17A, a display transition of the tilt meter displayed according to a rotational angular velocity when the imaging device 100 is rotated at 5 degrees/sec to the right by the user is shown (states 631 and 632). In this case, since the rotational angular velocity does not reach 20 degrees/sec, image advancing is not performed and the original state is returned (i.e., the state is returned from the state 632 to the state 631).

In FIG. 17B, a display transition of the tilt meter displayed according to a rotational angular velocity when the imaging device 100 is rotated at 10 degrees/sec to the right by the user is shown (states 633 and 634). In this case, since the rotational angular velocity does not reach 20 degrees/sec, image advancing is not performed and the original state is returned (i.e., the state is returned from the state 634 to the state 633). Similarly, when the imaging device 100 is rotated at 15 degrees/sec to the right by the user, the display state of the tilt meter is changed according to the tilt angular velocity, but since the rotational angular velocity does not reach 20 degrees/sec, image advancing is not performed. Similarly, even in this case, the original state is returned.

In FIG. 17C, a display transition of the tilt meter displayed according to a rotational angular velocity when the imaging device 100 is rotated at 20 degrees/sec to the right by the user is shown. In this case, since the rotational angular velocity reaches 20 degrees/sec, image advancing is performed. When the image advancing is performed and then the state of such an angle is maintained (i.e., in the case of 0 degree/sec), the original state is returned (i.e., the state is returned from the state 636 to the state 637). Further, when the rotational angular velocity is maintained (or when a state of the rotational angular velocity or more is maintained), the display state of the tilt meter is maintained according to a maintained period and image advancing is sequentially performed.

In FIGS. 17B and 17C, some of a display transition from the state 633 to the state 634 and a display transition from the state 635 to the state 636 are omitted.

Similarly, when the imaging device 100 is rotated to the left, the rectangular areas at the left from the middle of the tilt meter become sequentially black.

Display Example of Manipulation Support Information

Figure 18:
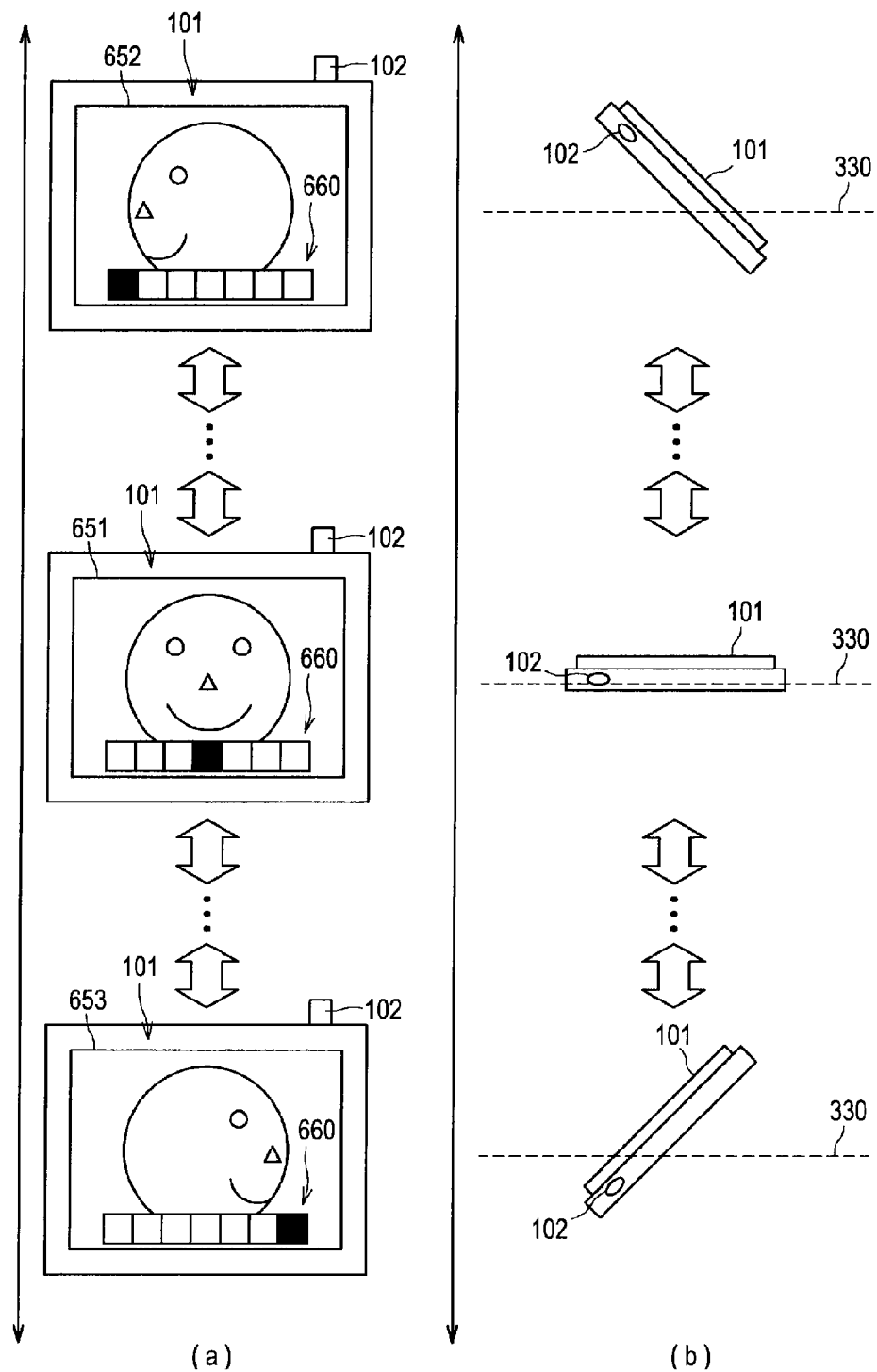
FIG. 18 schematically shows a relationship between a display transition in the input/output panel 101 and the posture of the imaging device 100 in the first embodiment of the present invention.
Figure 19:
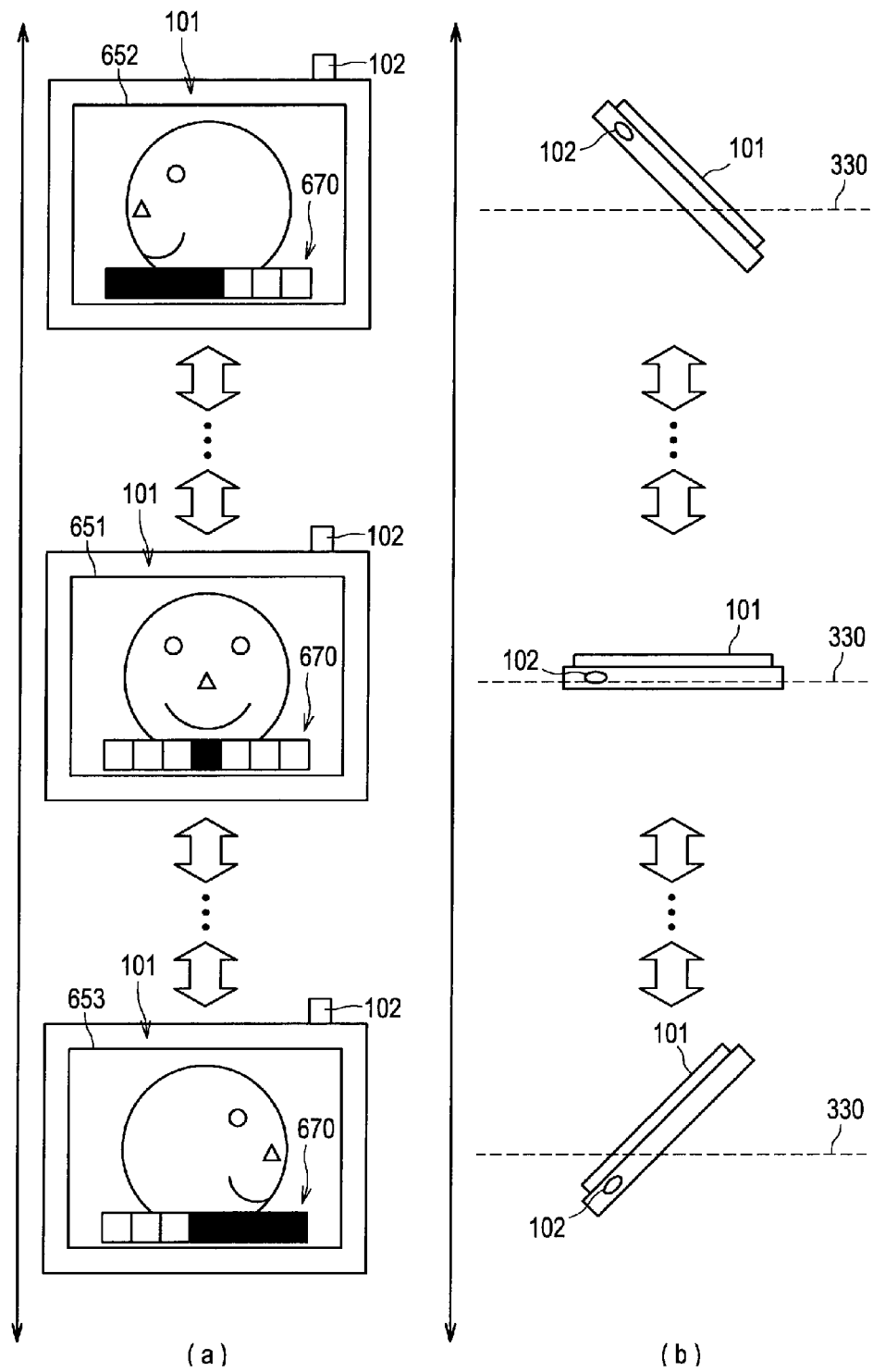
FIG. 19 schematically shows a relationship between a display transition in the input/output panel 101 and the posture of the imaging device 100 in the first embodiment of the present invention.

FIGS. 18 and 19 schematically show a relationship between a display transition in the input/output panel 101 and the posture of the imaging device 100 in the first embodiment of the present invention.

In FIG. 18, a transition example when the manipulation support information (the indicator) superimposed on the image to be displayed is displayed on the input/output panel 101 is shown. Further, in FIG. 19, a transition example in which manipulation support information (tilt meter) superimposed on the image to be displayed is displayed on the input/output panel 101 is shown. Further, in FIGS. 18(*b*) and 19(*b*), a transition example of the posture of the imaging device 100 when an image is displayed on the input/output panel 101 is shown. In the examples shown in FIGS. 18(*b*) and 19(*b*), a transition example when the posture of the imaging device 100 upon setting of the group image display mode is located on the plane of a horizontal plane 330 is shown. Further, in FIGS. 18 and 19, images displayed on the input/output panel 101 shown in each of in FIGS. 18(*a*) and 19(*a*) and postures of the imaging device 100 shown in each of in FIGS. 18(*b*) and 19(*b*) are shown to show a corresponding relationship at the left and right.

In FIGS. 18(*a*) and 19(*a*), the transition of the image displayed on the input/output panel 101 is shown. The images 651 to 653 displayed on the input/output panel 101 shown in FIGS. 18(*a*) and 19(*a*) are images obtained by imaging a face of the same person from different views. Accordingly, the user can obtain the feeling of viewing a three-dimensional object (a face of a person) by rapidly performing user manipulation to tilt the imaging device 100 to the left and right and rapidly performing image advancing or image returning. That is, the user manipulation to tilt the imaging device 100 to the left and right enables the user to obtain the feeling of viewing a pseudo-three-dimensional image. Further, the group to which the images 651 to 653 belong includes seven images (including the image 651 to 653). The image 651 is a representative image of the group and the images 652 and 653 are first and last images in a display order.

First, the case in which the manipulation support information (the indicator) superimposed on the image to be displayed is displayed on the input/output panel 101 will be described with reference to FIG. 18. As described above, the representative image (image 651) is displayed on the input/output panel 101 directly after the group image display mode is set. In this case, the manipulation support information 403 superimposed on the image 651 is displayed, similar to FIG. 7 C. Here, since the manipulation support information 403 is deleted or reduced when image advancing or image returning is performed for a certain time (or a certain number of times) by the user manipulation, the display example is omitted in FIGS. 18(*a*) and 19(*b*).

Here, a case in which the image 652 is displayed on the input/output panel 101 when the group image display mode has been set is assumed. In this case, since the image 652 is a first image in a display order among the seven images in the same group, a rectangular area at a left end in the indicator 660 has a different display aspect from other rectangular areas. In this case, it is difficult to perform further image returning.

Further, a case in which an image 653 is displayed on the input/output panel 101 when the group image display mode has been set is assumed. In this case, since the image 653 is a last image in the display order among the seven images in the same group, a rectangular area at a right end in the indicator 660 has a different display aspect from the other rectangular areas. In this case, it is difficult to perform further image advancing.

Thus, a mark indicating order relating to the images displayed on the input/output panel 101 in all of the plurality of images (e.g., the order specified by the normalization angle information) can be displayed as the indicator.

It is possible to easily recognize positions in a display order of images to be displayed in the group by displaying the images to be displayed and the indicator 660 when the group image display mode is set. Accordingly, it is possible to easily perform the image advancing or image returning manipulation while viewing the images to be displayed when performing the image advancing or image returning manipulation.

Next, a case in which the manipulation support information (the tilt meter) superimposed on the image to be displayed is displayed on the input/output panel 101 will be described with reference to FIG. 19.

Here, a case in which an image 652 is displayed on the input/output panel 101 when the group image display mode has been set is assumed. In this case, since the image 652 is a first image in the display order among the seven images in the same group, the rectangular areas from a middle of the tilt meter 670 to a left end have a different display aspect from the other rectangular areas. In this case, it is difficult to perform further image returning.

Further, a case in which an image 653 is displayed on the input/output panel 101 when the group image display mode has been set is assumed. In this case, since the image 653 is a last image in the display order among the seven images in the same group, the rectangular areas from the middle of the tilt meter 670 to a right end have a different display aspect from the other rectangular areas. In this case, it is difficult to perform further image advancing.

Thus, it is possible to display the mark indicating the change amount of the posture of the imaging device 100 necessary for changing the display state in the input/output panel 101, as the tilt meter. That is, it is possible to display the mark indicating the change amount of the posture of the imaging device 100 necessary for performing image advancing or image returning on a plurality of images, as the tilt meter.

Since the transition of the display state of the tilt meter 670 according to the tilt angle of the imaging device 100 is the same as the transition examples of FIGS. 15 to 17C, a description thereof will be omitted herein.

Thus, the user can easily recognize the tilt to display each image to be displayed by displaying the images to be displayed and the tilt meter 670 when the group image display mode has been set. Further, the user can easily recognize the positions in the display order of the images to be displayed in the group. Accordingly, the user can easily perform the image advancing or image returning manipulation while viewing the images to be displayed when performing the image advancing or image returning manipulation.

Operation Example of Imaging Device

Figure 20:
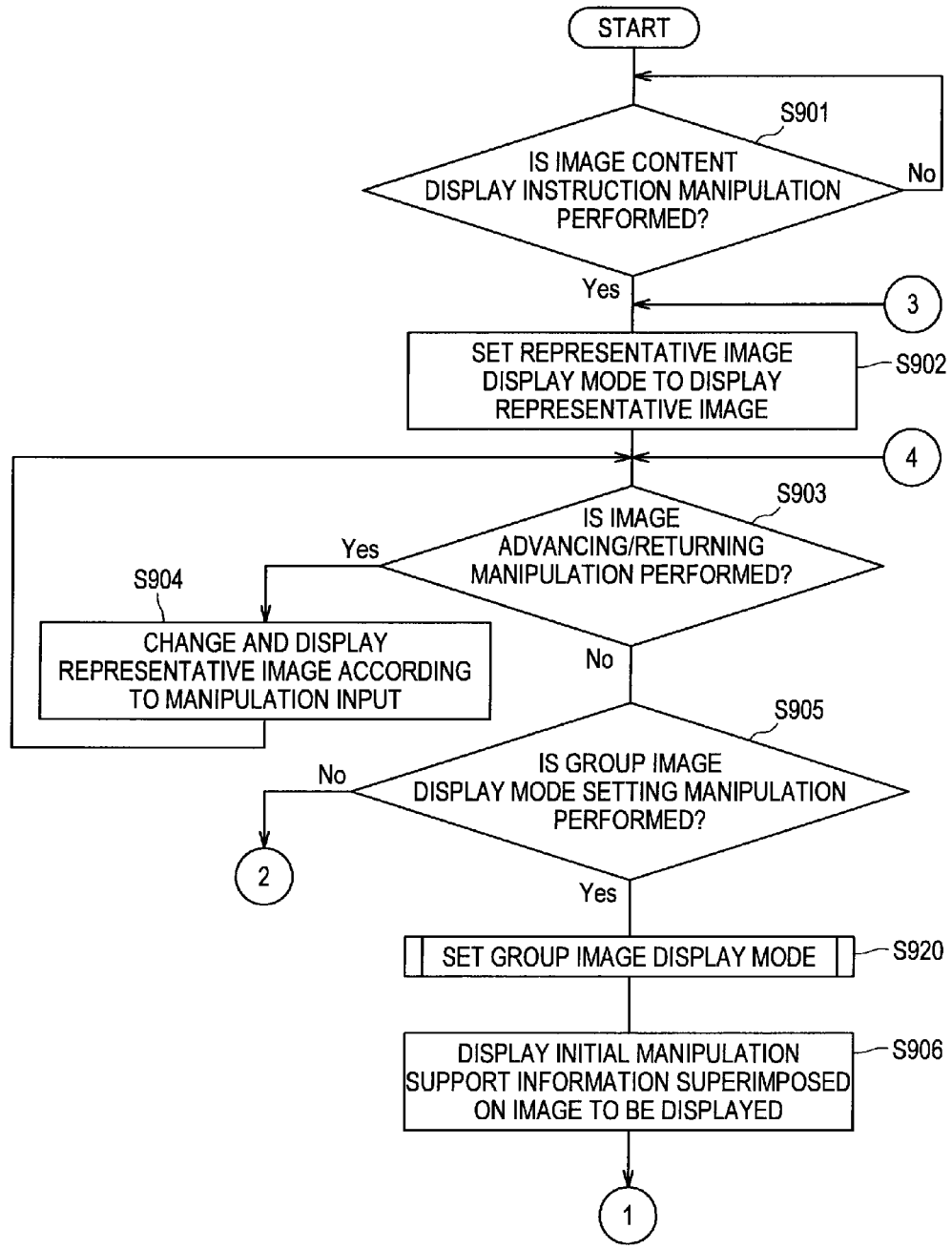
FIG. 20 is a flowchart showing an example of a processing procedure in an image content reproduction process in the imaging device 100 in the first embodiment of the present invention.
Figure 21:
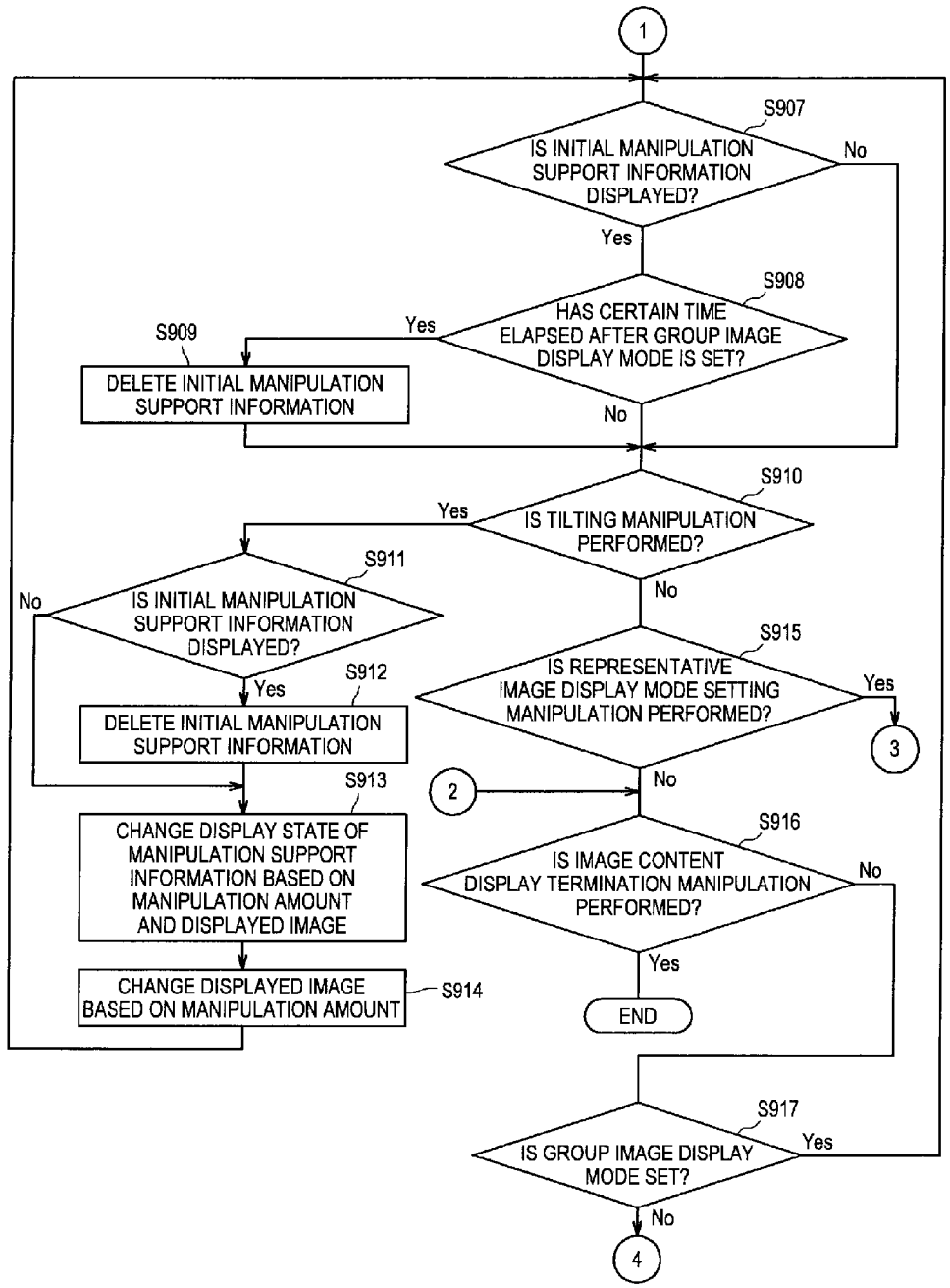
FIG. 21 is a flowchart showing an example of a processing procedure in an image content reproduction process in the imaging device 100 in the first embodiment of the present invention.

FIG. 20 and FIG. 21 are flowcharts showing an example of a processing procedure of an image content reproduction process in the imaging device 100 according to the first embodiment of the present invention.

First, a determination is made as to whether an image content display instruction manipulation is performed (step S901), and when the display instruction manipulation is not performed, monitoring is continued. On the other hand, when the display instruction manipulation is performed (step S901), the control unit 140 sets the representative image display mode and the representative image reproduction unit 150 displays a representative image and non-grouped images on the display unit 111 (step S902).

Subsequently, a determination is made as to whether the image advancing manipulation or image returning manipulation is performed in a state in which the representative image display mode has been set (step S903). When the image advancing manipulation or the image returning manipulation is performed (step S903), the representative image reproduction unit 150 performs display switching of the image displayed on the display unit 111 (step S904). That is, image advancing or image returning of the image displayed on the display unit 111 is performed.

When the image advancing manipulation or image returning manipulation is not performed (step S903), a determination is made as to whether the group image display mode setting manipulation is performed (step S905), and when the group image display mode setting manipulation is not performed, the process proceeds to step S916. On the other hand, when the group image display mode setting manipulation is performed (step S905), a group image display mode setting process is performed (step S920). The group image display mode setting process will be explained in detail with reference to FIG. 22.

Subsequently, the group image reproduction unit 160 displays initial manipulation support information (e.g., the manipulation support information 403 shown in FIG. 7(c)) superimposed on the image on the display unit 111 (step S906). That is, the group image reproduction unit 160 decodes the image content acquired from the image content storage unit 200, and renders a display image in the rendering memory 170 based on the decoded image content. The group image reproduction unit 160 simultaneously displays one (representative image) of the images rendered in the rendering memory 170 and the initial manipulation support information on the display unit 111.

Subsequently, a determination is made as to whether the initial manipulation support information is displayed (step S907), and when the initial manipulation support information is not displayed, the process proceeds to step S910. On the other hand, when the initial manipulation support information is displayed (step S907), a determination is made as to whether a certain time elapses after the group image display mode is set (step S908). When a certain time elapses after the group image display mode is set (step S908), the group image reproduction unit 160 deletes the initial manipulation support information displayed on the display unit 111 (step S909). On the other hand, when a certain time has not elapsed after the group image display mode is set (step S908), a determination is made as to whether a tilt manipulation by the user is performed (step S910). That is, the group image reproduction unit 160 determines whether the posture of the imaging device 100 is changed above a certain amount based on the analysis information output from the analysis unit 130.

When the tilt manipulation by the user is performed (step S910), a determination is made as to whether the initial manipulation support information is displayed (step S911), and when the initial manipulation support information is not displayed, the process proceeds to step S913. On the other hand, when the initial manipulation support information is displayed (step S911), the group image reproduction unit 160 deletes the initial manipulation support information displayed on the display unit 111 (step S912).

Subsequently, the group image reproduction unit 160 changes the display state of the manipulation support information (the indicator or the tilt meter) based on the manipulation amount according to the tilt manipulation by the user and the display image (the image displayed on the display unit 111) (step S913). Subsequently, when the manipulation amount according to the tilt manipulation by the user exceeds a display switching reference, the group image reproduction unit 160 performs display switching (image advancing or image returning) on the image displayed on the display unit 111 (step S914), and the process returns to step S907. When the manipulation amount according to the tilt manipulation by the user does not exceed the display switching reference, the group image reproduction unit 160 does not perform display switching (image advancing or image returning) on the image displayed on the display unit 111 and the process returns to step S907.

When a tilt manipulation by the user is not performed (step S910), a determination is made as to whether the representative image display mode setting manipulation is performed (step S915), and when the setting manipulation is performed, the process returns to step S902. On the other hand, when the representative image display mode setting manipulation is not performed (step S915), a determination is made as to whether the image content display termination manipulation is performed (step S916), and when the display termination manipulation is performed, the image content reproduction process operation is terminated. When the image content display termination manipulation is not performed (step S916), a determination is made as to whether the group image display mode has been set (step S917). When the group image display mode has been set (step S917), the process returns to step S907, and when the group image display mode has not been set (that is, the representative image display mode has been set), the process returns to step S903. Steps S906 to S920 are one example of a control procedure defined in the claims. Step S910 is one example of a detection procedure defined in the claims.

Figure 22:
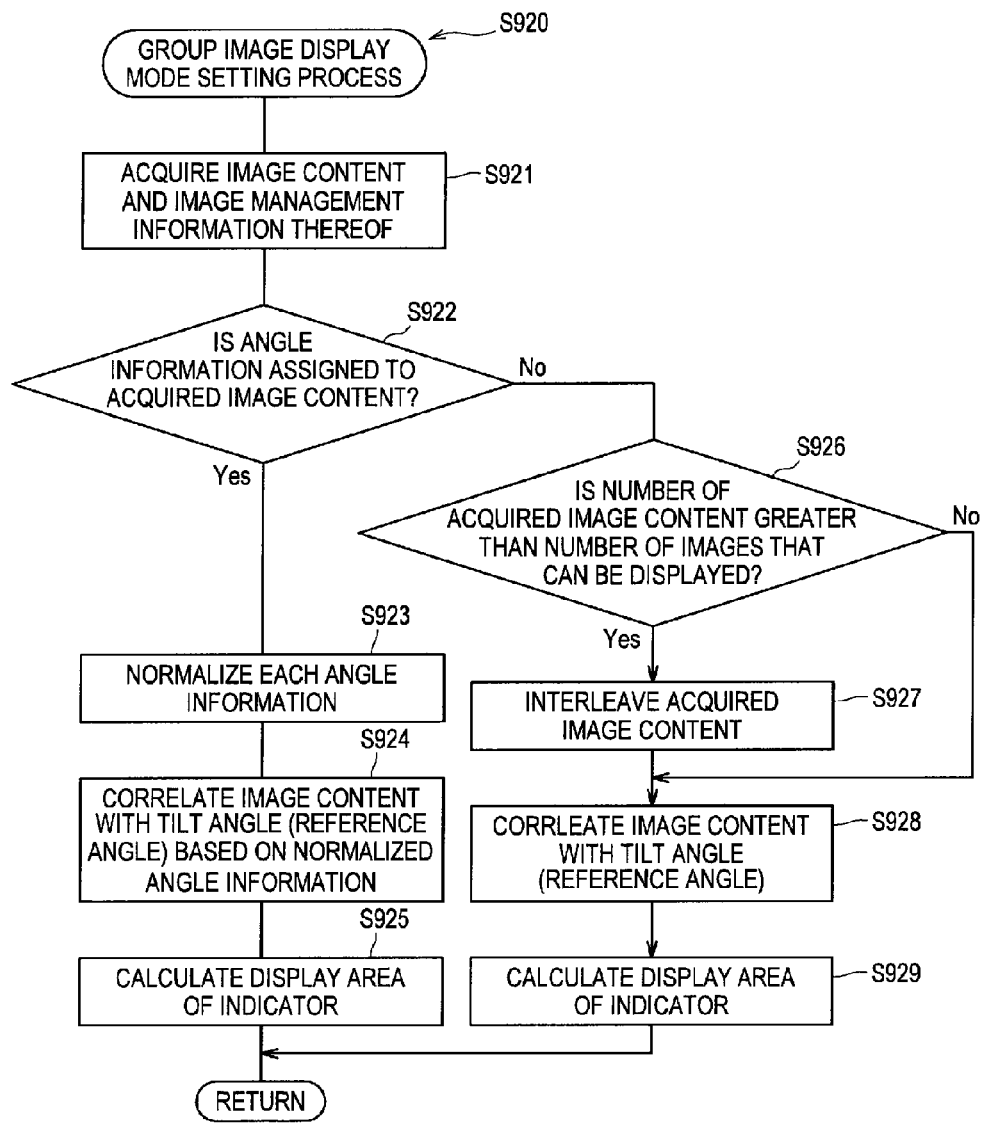
FIG. 22 is a flowchart showing an example of a group image display mode setting process in a processing procedure of an image content reproduction process in the imaging device 100 in the first embodiment of the present invention.

FIG. 22 is a flowchart showing an example of a group image display mode setting process (a processing procedure in step S920 shown in FIG. 20) in a processing procedure of the image content reproduction process in the imaging device 100 according to the first embodiment of the present invention.

First, the group image reproduction unit 160 acquires each image content belonging to a group corresponding to the representative image displayed on the display unit 111 upon a group image display mode setting manipulation from the image content storage unit 200 (step S921). Further, the group image reproduction unit 160 acquires image management information associated with each image content belonging to the group from the image management information storage unit 210 (step S921).

Subsequently, the manipulation method determination unit 180 determines whether angle information is included in the acquired image management information (step S922). When the angle information is included in the acquired image management information (step S922), the manipulation method determination unit 180 normalizes the angle information included in the acquired image management information for each image content (step S923).

Subsequently, the manipulation method determination unit 180 associates the acquired image content with the tilt angle (the reference angle) based on the normalized angle information (normalization angle information) (step S924). In this case, when the number of the acquired image contents is greater than the number of tilt angles (reference angles), the manipulation method determination unit 180 performs an interleaving process on the acquired image contents so that the number of image contents is in a range of the number of tilt angles (reference angles). Subsequently, the manipulation method determination unit 180 calculates the display area of the indicator based on a correspondence relationship resulting from the association (step S925).

Further, when the angle information is not included in the acquired image management information (step S922), the manipulation method determination unit 180 determines whether the number of the acquired image contents is greater than the number of images that can be displayed (the number of tilt angles (reference angles)) (step S926). When the number of acquired image contents is equal to or less than the number of images that can be displayed (step S926), the process proceeds to step S928. On the other hand, when the number of the acquired image contents is greater than the number of images that can be displayed (step S926), the manipulation method determination unit 180 performs an interleaving process on the acquired image contents so that the number of images is in a range of the number of images that can be displayed (step S927).

Subsequently, the manipulation method determination unit 180 associates the acquired image contents (or the image contents after the interleaving process) with the tilt angles (reference angles) (step S928). The manipulation method determination unit 180 then calculates the display area of the indicator based on a correspondence relationship resulting from the association (step S929).

2. Variant

In the foregoing, the example in which the manipulation support information (the tilt meter or the indicator) structured by a rod-shaped rectangle is displayed as the manipulation support information has been shown. In the variant, an example of the manipulation support information (the tilt meter or the indicator) displayed with another structure is shown. The configuration of the imaging device 100 is the same as the first embodiment of the present invention except that the display aspect of the manipulation support information differs. Accordingly, hereinafter, a difference with the first embodiment of the present invention will be mainly described and a description of the same portions will be omitted.

Display Example of Tilt Meter

Figure 23A:
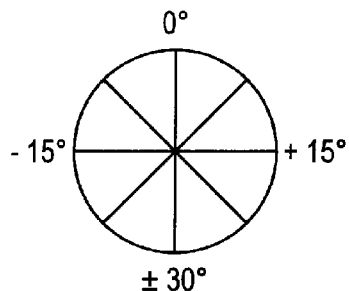
FIG. 23A shows manipulation support information (tilt meter) displayed by a group image reproduction unit 160.
Figure 23B:
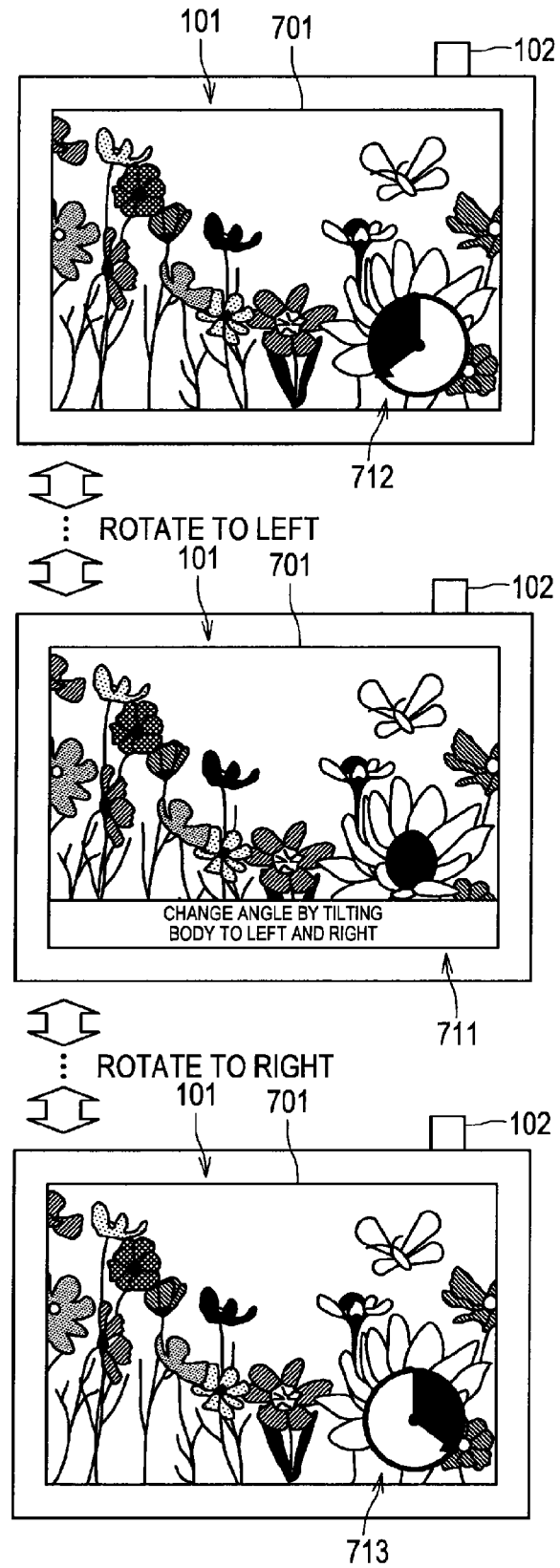
FIG. 23B shows a display transition example in the input/output panel 101 in a variant of the first embodiment of the present invention.

FIGS. 23A and 23B shows manipulation support information (a tilt meter) displayed by the group image reproduction unit 160 and a display transition example in the input/output panel 101 in the variant of the first embodiment of the present invention.

In FIG. 23A, one example of the manipulation support information (the tilt meter) structured in a circular shape is shown. Corresponding angles are indicated at outer sides of the circle constituting the tilt meter. Further, the tilt angle of the imaging device 100 is indicated by an arrow from a center of the circle constituting the tilt meter to the position on the circle corresponding to the tilt angle.

In FIG. 23B, a transition of the image displayed on the input/output panel 101 is shown. As described above, the representative image (image 701) is displayed on the input/output panel 101 directly after the group image display mode is set. In this case, manipulation support information 711 superimposed on the image 701 is displayed, similar to FIG. 7 C. Here, the manipulation support information 711 may be deleted or reduced when image advancing or image returning is performed for a certain time (or a certain number of times) by the user manipulation.

Further, in the example shown in FIG. 23B, a display transition example when image advancing or image returning is performed according to the rotation angle of the imaging device 100 is shown. Further, in this example, an example in which the reference angle when image advancing or image returning is performed is 30 degrees and image advancing or image returning is performed each time the tilt angle of the imaging device 100 exceeds 30 degrees is shown.

For example, a case in which the user rotates the imaging device 100 to the left in a state in which the user holds the imaging device 100 is assumed. For example, when an angle at which the imaging device 100 is rotated to the left reaches 20 degrees, the tilt meter 712 with an arrow from the center of the circle constituting the tilt meter to a position on the circle corresponding to the rotation angle (20 degrees) is displayed on the image 701. Here, in this case, image advancing is not performed. Further, a case in which the user rotates the imaging device 100 to the left in a state in which the user holds the imaging device 100 and the rotation angle reaches 30 degrees is assumed. In this case, the tilt meter with an arrow from the center of the circle constituting the tilt meter to a position on the circle (a bottom of the circle) corresponding to the rotation angle (30 degrees) is displayed on the image 701, an indication of reaching a tilt of image advancing is displayed, and image advancing is performed.

Similarly, when the imaging device 100 is rotated to the right, a tilt meter 713 with an arrow from the center of the circle constituting the tilt meter to the position on the circle corresponding to the rotation angle is superimposed on the image 701 and displayed.

Figure 24A:
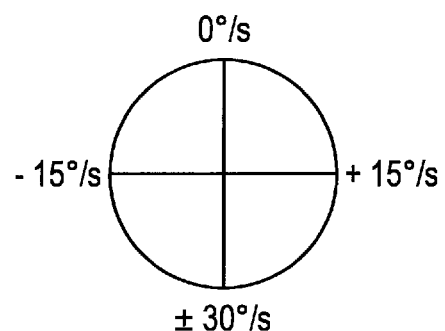
FIG. 24A shows manipulation support information (tilt meter) displayed by a group image reproduction unit 160.
Figure 24B:
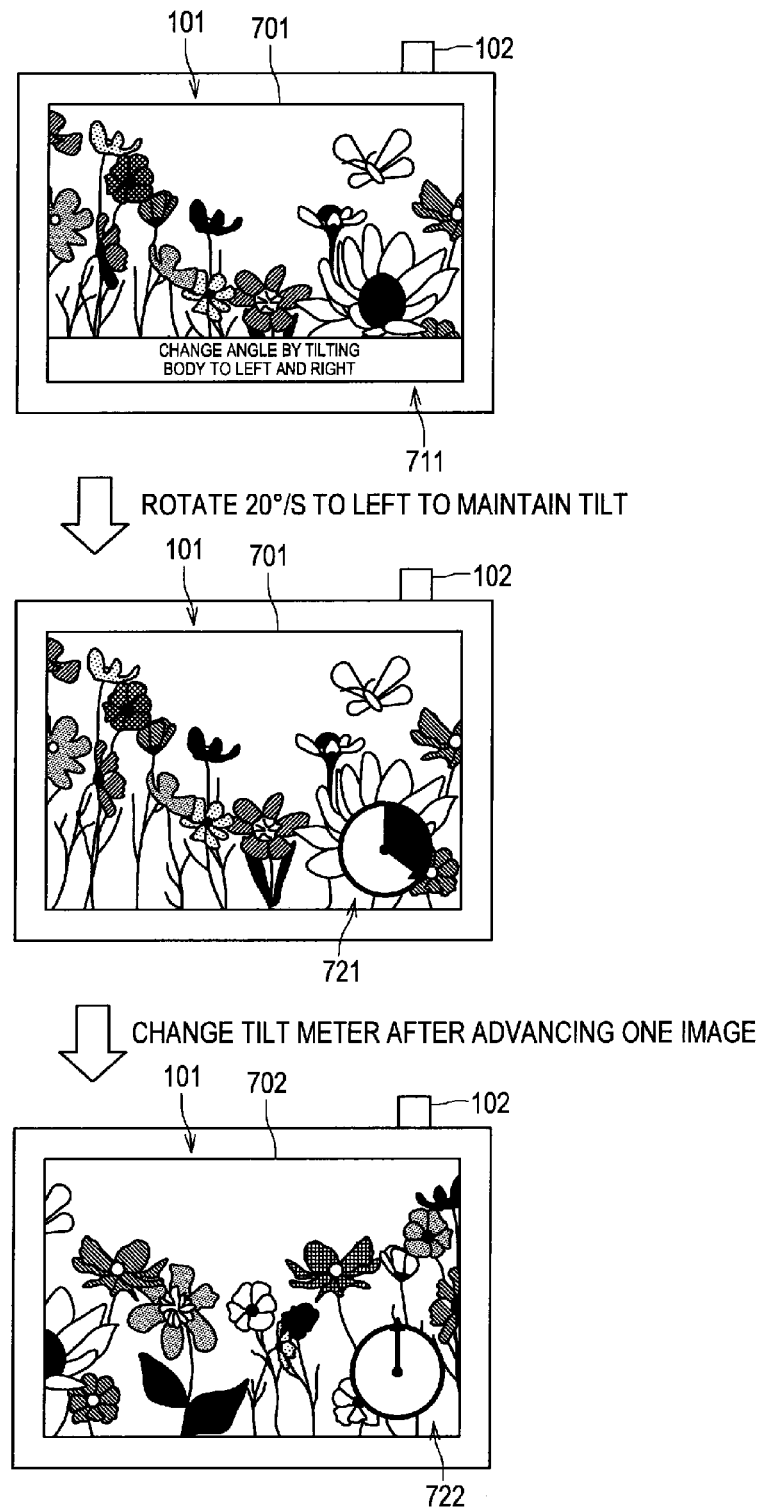
FIG. 24B shows a display transition example in the input/output panel 101 in a variant of the first embodiment of the present invention.

FIGS. 24A and 24B shows an example of manipulation support information (a tilt meter) displayed by the group image reproduction unit 160 and a display transition in the input/output panel 101 in the variant of the first embodiment of the present invention.

In FIG. 24A, an example of manipulation support information (a tilt meter) structured in a circular shape is shown. Corresponding rotational angular velocities are indicated at outer sides of the circle constituting the tilt meter. Further, the rotational angular velocity of the imaging device 100 is indicated by an arrow from the center of the circle constituting the tilt meter to a position on the circle corresponding to the rotational angular velocity.

In FIG. 24B, a transition of the image displayed on the input/output panel 101 is shown. This example is the same as that shown in FIG. 23B in that a representative image (an image 701) is displayed on the input/output panel 101 and manipulation support information 711 is superimposed on the image 701 and displayed.

Further, in the example shown in FIG. 24B, a display transition example when image advancing or image returning is performed according to the rotational angular velocity of the imaging device 100 is shown. Further, in this example, an example in which the rotational angular velocity (rotation angle/sec) when image advancing or image returning is performed is 20 degrees/sec and image advancing or image returning is performed each time the rotational angular velocity of the imaging device 100 reaches 20 degrees/sec is shown.

For example, a case in which the user rotates the imaging device 100 to the left in a state in which the user holds the imaging device 100 and the rotational angular velocity reaches 20 degrees/sec is assumed. In this case, a tilt meter 721 with an arrow from the center of the circle constituting the tilt meter to a position on the circle corresponding to the rotational angular velocity (20 degrees/sec) is displayed on the image 701, an indication of reaching a rotational angular velocity of image advancing is displayed, and image advancing is performed. The image 702 is displayed by image advancing. Further, when a state of the angle is maintained after image advancing (i.e., in the case of 0 degree/sec), the original state is returned. That is, a tilt meter 722 with an arrow from the center of the circle constituting the tilt meter to a position on the circle (a top of the circle) corresponding to the rotational angular velocity (0 degree/sec) is displayed on the image 702.

Similarly, when the imaging device 100 is rotated to the right, a tilt meter with an arrow from the center of the circle constituting the tilt meter to the position on the circle corresponding to the rotational angular velocity is displayed.

In the tilt meter shown in FIGS. 23A to 24B, a range of the top of the circle and a position on the circle indicated by the arrow (a range of a pan system specified by the two points and the center of the circle) may have a different display aspect from other areas to be easily recognized by the user.

Display Example of Indicator

FIGS. 25 to 28 show a display transition example in the input/output panel 101 in the variant of the first embodiment of the present invention. In such an example, a variant of a display aspect of manipulation support information (indicator) displayed by the group image reproduction unit 160 is shown. Further, in FIGS. 25 and 27, an example in which display support information (e.g., icon) 802 and 812 indicating the type of a group to be displayed is displayed with the indicator is shown.

Figure 25:
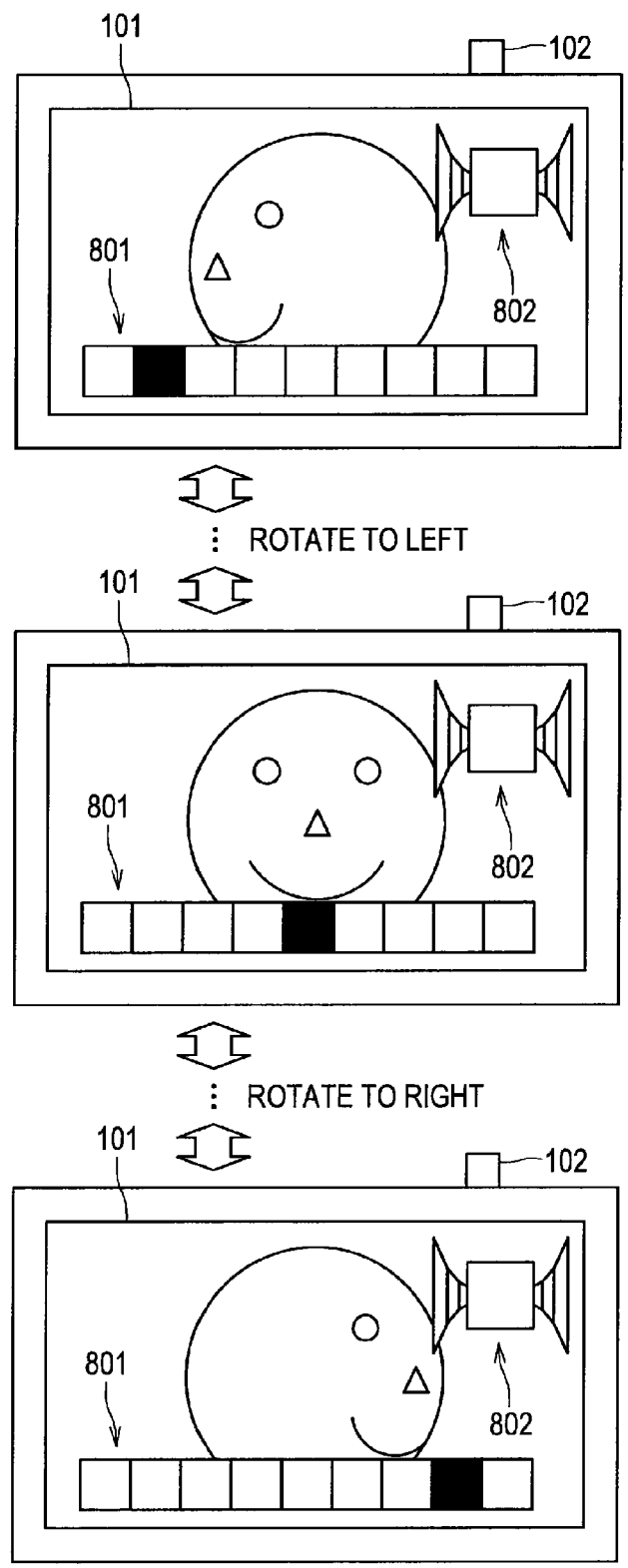
FIG. 25 shows a display transition example in the input/output panel 101 in a variant of the first embodiment of the present invention.
Figure 26:
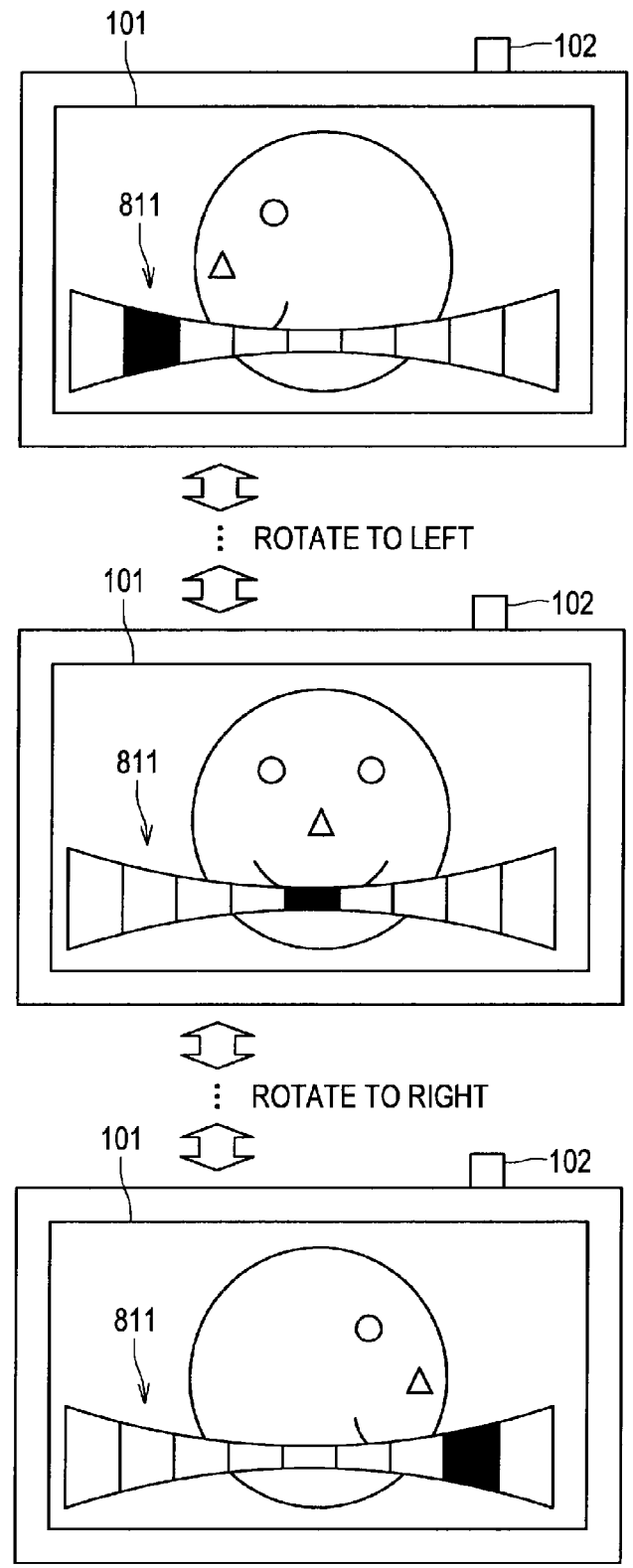
FIG. 26 shows a display transition example in the input/output panel 101 in a variant of the first embodiment of the present invention.

In FIGS. 25 and 26, a display transition example when a multi-view image is displayed is shown. In FIG. 25, an example in which an indicator 801 and display support information 802 indicating that the type of a group to be displayed is "multi-view image" are simultaneously displayed is shown. In FIG. 26, an example in which an indicator 811 indicating that the type of a group to be displayed is "multi-view image" is displayed is shown.

Figure 27:
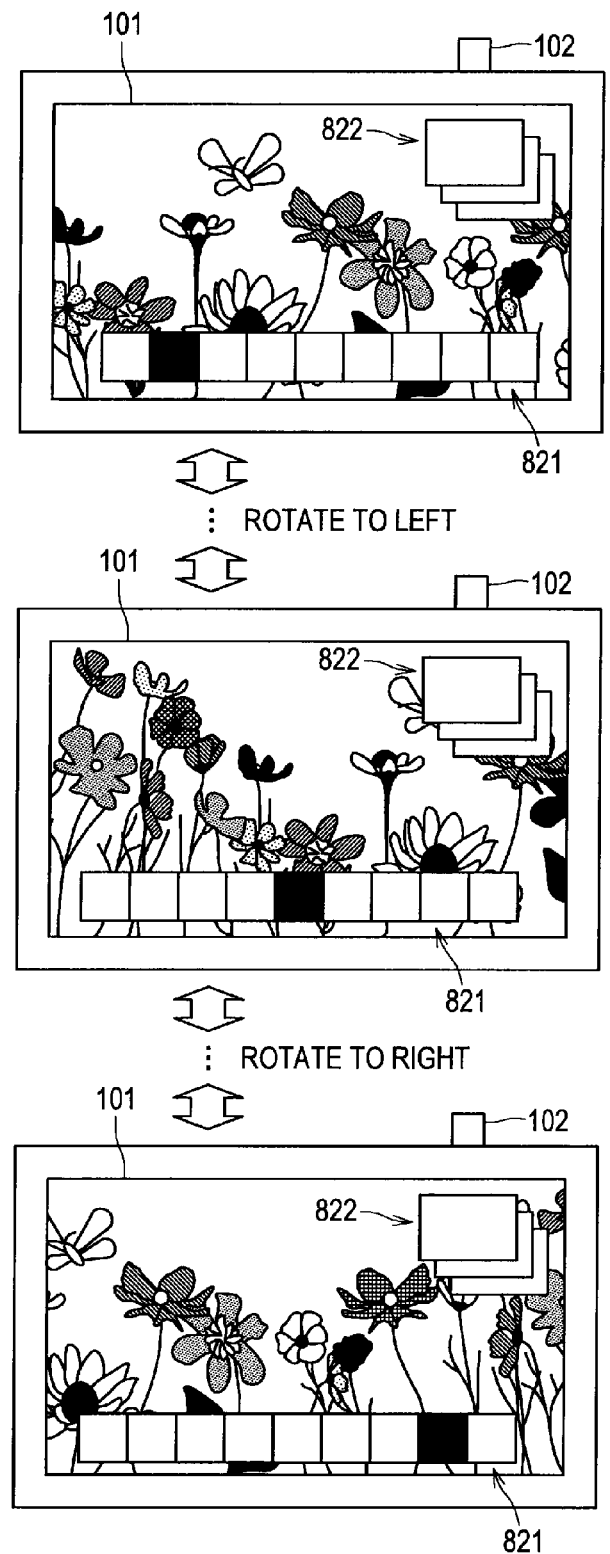
FIG. 27 shows a display transition example in the input/output panel 101 in a variant of the first embodiment of the present invention.
Figure 28:
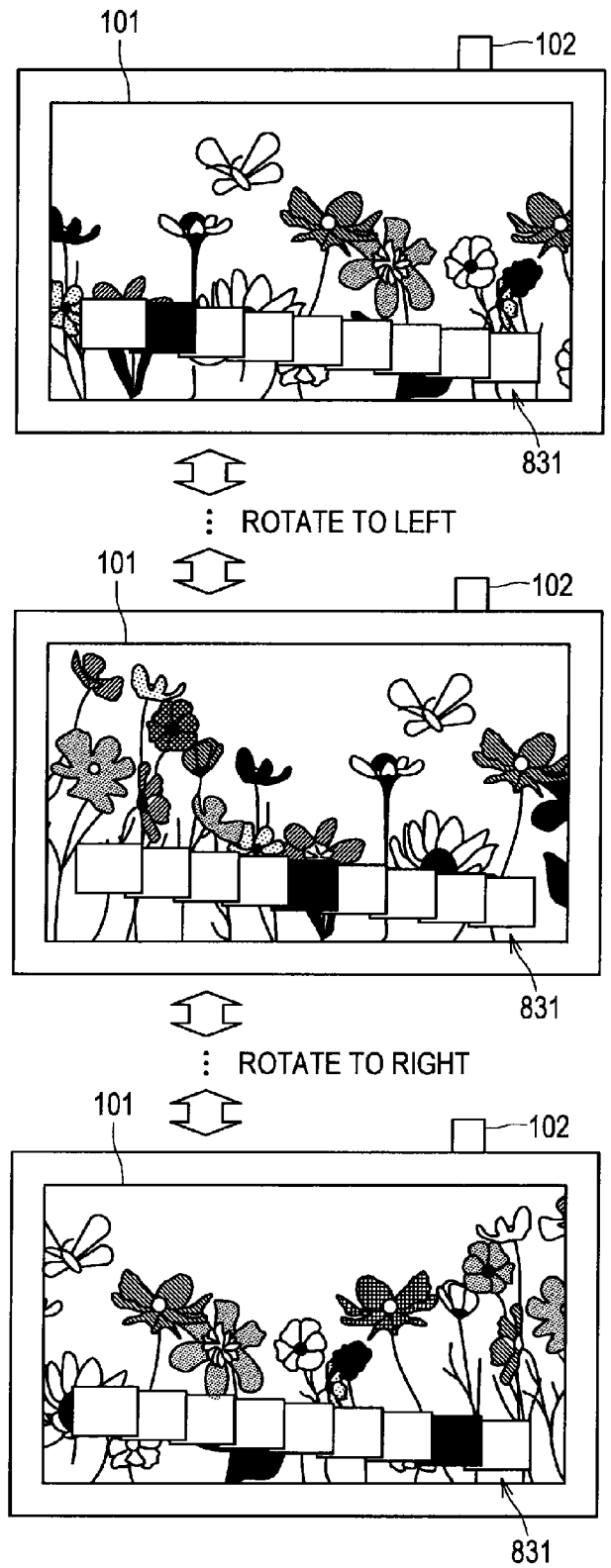
FIG. 28 shows a display transition example in the input/output panel 101 in a variant of the first embodiment of the present invention.

In FIGS. 27 and 28, a display transition example when a multi-shot image is displayed is shown. In FIG. 27, an example in which the indicator 821 and display support information 822 indicating that the type of the group to be displayed is a "multi-shot image" are simultaneously displayed is shown. In FIG. 28, an example in which an indicator 831 indicating that the type of the group to be displayed is a "multi-shot image" is displayed is shown.

Since a display state in the indicator shown in FIGS. 25 to 28 is the same as the example shown in FIG. 18, a description thereof will be omitted herein.

Thus, based on the correlativity (e.g., corresponding to the group type) between the images in the image group associated with the image displayed on the input/output panel 101, a display aspect of the indicator is changed from the image group to the image group and then the indicator is displayed.

Further, the user can easily perform a manipulation to display each image to be displayed by displaying the image to be displayed and the display support information indicating the type of the group to be displayed when the group image display mode has been set. That is, when image advancing or image returning manipulation is performed, the user can easily perform the manipulation while viewing the image to be displayed.

As described above, in the embodiment of the present invention, the initial manipulation support information (e.g., the manipulation support information 403 shown in FIG. 7(c)) is displayed upon setting of the group image display mode. Accordingly, it is possible to prevent a desired image from missing due to, for example, a bad way of holding the imaging device 100 and switching of a displayed view upon initiation of image reading.

Further, for example, the user can easily recognize a tilt angle at which a view is switched by displaying the tilt meter when the multi-view image is displayed upon setting of the group image display mode. Further, for example, even when an image in which a change of a switched view is small is displayed, the user can easily recognize that the image is switched by the user performing a manipulation to tilt the device.

Further, for example, the user can easily recognize one of all views to which a currently displayed view corresponds by displaying the indicator when the multi-view image is displayed upon setting of the group image display mode. Further, for example, when an image of a view photographed from a rightmost side is displayed, the user can easily recognize that the view is not switched even though a right side is further tilted down.

In the example shown above, the example in which the display state in the input/output panel 101 is changed by rotating the imaging device 100 about the vertical direction of the imaging device 100 has been shown. Here, the embodiment of the present invention may be applied to a case in which the display state in the input/output panel 101 is changed by rotating the imaging device 100 about the horizontal direction of the imaging device 100. In this case, for example, the image may be changed by up and down tilt manipulations, and the indicator or the tilt meter may be vertically arranged and displayed. Further, for example, when an image in which there is a view in both directions of up and down and left and right is displayed, view switching may be performed by a tilt manipulation in both directions of up and down and left and right, and the indicator or the tilt meter may be displayed for both directions of up and down and left and right. The embodiment of the present invention may also be applied to a case in which the display state in the input/output panel 101 is changed by sliding (parallel movement) toward any of up, down, left, right, backward and forward directions of the imaging device 100.

While the imaging device has been described by way of example in the embodiments of the present invention, the embodiments of the present invention may be applied to an image processing device capable of displaying image contents stored in the recording medium on the display unit. For example, the embodiments of the present invention may be applied to image processing devices, such as a mobile phone, a navigation system, and a portable media player with an imaging function.

The embodiment of the present invention illustrates one example for embodying the present invention, and the matters in the embodiment of the present invention and the specified matters of the invention in the claims have a correspondence relationship, as described in the embodiment of the present invention. Similarly, the specified matters of the invention in the claims and the matters in the embodiment of the present invention having the same names as the specified matters have a correspondence relationship. Here, the present invention is not limited to the embodiments, and various variations may be made to the embodiments without departing from the spirit and scope of the present invention.

Further, the processing procedure described in the embodiments of the present invention may be regarded as a method including a series of procedures or as a program for causing a computer to execute a series of procedures or a recording medium having the program stored thereon. The recording medium may be, for example, a compact disc (CD), a mini disc (MD), a digital versatile disc (DVD), a memory card, or a Blu-ray disc (registered trademark).

REFERENCE SIGNS LIST

100 Imaging device
101 Input/output panel
102 Shutter button
110 Input/output unit
111 Display unit
112 Manipulation receiving unit
120 Posture detection unit
130 Analysis unit
140 Control unit
150 Representative image reproduction unit
160 Group image reproduction unit
170 Rendering memory
180 Manipulation method determination unit
200 Image content storage unit
210 Image management information storage unit

The invention claimed is:

1. A method of a processor to control a display of images, said method comprising:
  detecting posture of an image display device with a sensor;
  sequentially displaying images of a group of images on the image display device based on changes in the detected posture; and
  displaying manipulation support information, the manipulation support information representing a relation between a change in the detected posture and an image of the group of images,
  in which a relationship between a rotation angle associated with the posture of the image display device and a manipulation range representative of an overall angular range is determined according to a number of images to be displayed,
  in which a different posture is assigned to each image of the images to be displayed such that when the image display device has a respective posture a respective image associated therewith is displayed on the image display device, and
  said manipulation support information indicating a position of the image of the group of images within the manipulation range.

2. The method of claim 1 wherein the manipulation support information comprises a graphic tilt meter.

3. The method of claim 1 wherein the processor associates a normalized tilt angle with each said image of the images to be displayed.

4. The method of claim 3 wherein the normalized tilt angle comprises an angle determined as a function of image capture angle information and a maximum tilt angle.

5. The method of claim 4 wherein the image capture angle information comprises a range of captured image angles.

6. The method of claim 5 wherein the maximum tilt angle comprises a display viewing angle limit.

7. The method of claim 1 further comprising sequentially displaying entrance images for groups of images on the image display device based on changes in the detected posture.

8. The method of claim 1 wherein the sensor comprises a gyroscopic sensor.

9. The method of claim 1, wherein the number of images to be displayed is determined according to the manipulation range.

10. The method of claim 1, wherein the manipulation support information further indicates a type of image of the image currently displayed.

11. The method of claim 1, wherein a display mode is provided which involves a representative image of the group of images, and wherein when the representative image is selected other images within the group are displayed.

12. The method of claim 1, wherein the manipulation support information is displayed in a circular shape.

13. The method of claim 1, wherein the manipulate support information which is displayed always provides an indication of the overall angular range.

14. The method of claim 1, further comprising extracting a number of images from the group of images when a total number of the images in the group of images is larger than a total number of available different postures so as to obtain the images to be displayed.

15. An apparatus for control of displaying of images comprising:
- an image display;
- a sensor to detect posture of the image display; and
- a processor to (i) control sequentially displaying images of a group of images on the image display based on changes in the detected posture, and (ii) control a display of manipulation support information, the manipulation support information representing a relation between a change in the detected posture and an image of the group of images,
- in which a relationship between a rotation angle associated with the posture of the image display device and a manipulation range representative of an overall angular range is determined according to a number of images to be displayed,
- in which a different posture is assigned to each image of the images to be displayed such that when the image display device has a respective posture a respective image associated therewith is displayed on the image display device, and
- said manipulation support information indicating a position of the image of the group of images within the manipulation range.

16. The apparatus of claim 15 wherein the manipulation support information comprises a tilt meter.

17. The apparatus of claim 15 wherein the processor controls associating a normalized tilt angle with each said image of the images to be displayed.

18. The apparatus of claim 17 wherein the processor controls calculating the normalized tilt angle as a function of image capture angle information and a maximum tilt angle.

19. The apparatus of claim 18 wherein the image capture angle information comprises a range of captured image angles.

20. The apparatus of claim 18 wherein the maximum tilt angle comprises a display viewing angle limit.

21. The apparatus of claim 15 wherein the detection of posture comprises a detection of angular velocity and wherein the processor controls changing the display based on the angular velocity.

22. The apparatus of claim 15 wherein the processor controls sequentially displaying entrance images for groups of images on the image display device based on changes in the detected posture.

23. The apparatus of claim 15 wherein the sensor comprises a gyroscopic sensor.

24. The apparatus of claim 15, wherein the number of images to be displayed is determined according to the manipulation range.

25. The apparatus of claim 15, wherein the manipulation support information further indicates a type of image of the image currently displayed.

26. The apparatus of claim 15, wherein a display mode is provided which involves a representative image of the group of images, and wherein when the representative image is selected other images within the group are displayed.

27. The apparatus of claim 15, wherein the manipulation support information is displayed in a circular shape.

28. The apparatus of claim 15, in which the processor is configured to extract a number of images from the group of images when a total number of the images in the group of images is larger than a total number of available different postures so as to obtain the images to be displayed.

29. A non-transitory computer readable storage medium having stored thereon a program which when executed by a processor causes the processor to perform a method of controlling a display of images, said method comprising:
- detecting posture of an image display device with use of a sensor;
- sequentially displaying images of a group of images on the image display device based on changes in the detected posture; and
- displaying manipulation support information, the manipulation support information representing a relation between a change in the detected posture and an image of the group of images,
- in which a relationship between a rotation angle associated with the posture of the image display device and a manipulation range representative of an overall angular range is determined according to a number of images to be displayed,
- in which a different posture is assigned to each image of the images to be displayed such that when the image display device has a respective posture a respective image associated therewith is displayed on the image display device, and
- said manipulation support information indicating a position of the image of the group of images within the manipulation range.

30. The non-transitory computer readable storage medium of claim 29, in which when the program is executed, the processor associates a normalized tilt angle with each said image of the images to be displayed.

31. The non-transitory computer readable storage medium of claim 30, in which the normalized tilt angle comprises an angle determined as a function of image capture angle information and a maximum tilt angle.

32. The non-transitory computer readable storage medium of claim 31, in which the image capture angle information comprises a range of captured image angles.

* * * * *